US012483820B2

(12) United States Patent
Mosgrove et al.

(10) Patent No.: US 12,483,820 B2
(45) Date of Patent: Nov. 25, 2025

(54) RETAINING PIECE FOR AN EARPIECE

(71) Applicant: Bose Corporation, Framingham, MA (US)

(72) Inventors: Colin Taylor Mosgrove, Needham, MA (US); Andrew Poynot, Norfolk, MA (US); Ethan Frances Norton, Jamaica Plain, MA (US)

(73) Assignee: Bose Corporation, Framingham, MA (US)

( * ) Notice: Subject to any disclaimer, the term of this patent is extended or adjusted under 35 U.S.C. 154(b) by 236 days.

(21) Appl. No.: 18/207,816

(22) Filed: Jun. 9, 2023

(65) Prior Publication Data

US 2024/0414467 A1 Dec. 12, 2024

(51) Int. Cl.
*H04R 1/10* (2006.01)

(52) U.S. Cl.
CPC .................................... *H04R 1/105* (2013.01)

(58) Field of Classification Search
CPC ...... H04R 1/105; H04R 25/65; H04R 25/656; H04R 1/1016; H04R 1/02; H04R 1/083; H04R 1/1058; H04R 1/083; H04R 1/1066; G10K 11/175
See application file for complete search history.

(56) References Cited

U.S. PATENT DOCUMENTS

| | | | | | |
|---|---|---|---|---|---|
| 5,712,453 | A * | 1/1998 | Bungardt | H04R 1/1066 | 181/135 |
| 7,536,008 | B2 * | 5/2009 | Howes | H04R 1/083 | 381/380 |
| 8,873,786 | B2 * | 10/2014 | Larsen | H04R 25/656 | 381/328 |
| 8,897,480 | B2 * | 11/2014 | Tan | H04R 1/1016 | 381/370 |
| 11,095,973 | B1 * | 8/2021 | Zalisk | G10K 11/175 | |
| 11,297,408 | B2 * | 4/2022 | Zalisk | H04R 1/02 | |
| 11,800,273 | B2 * | 10/2023 | Zalisk | H04R 1/1083 | |
| 12,238,471 | B2 * | 2/2025 | Zalisk | H04R 1/02 | |
| 2018/0070165 | A1 * | 3/2018 | Hatfield | H04R 1/1058 | |
| 2023/0078406 | A1 | 3/2023 | Zalisk | | |

OTHER PUBLICATIONS

International Search Report and Written Opinion dated Sep. 5, 2024 for International application No. PCT/US2024/033005.

* cited by examiner

*Primary Examiner* — Angelica M Mckinney

(57) ABSTRACT

A retaining piece includes a retainer portion, a tubular wall portion, and a cantilevered portion. The tubular portion extends around a central axis that extends through the center of the retaining piece. The retaining piece also includes a locking feature that includes a first alignment feature arranged along the tubular wall portion in direction substantially parallel to the central axis.

15 Claims, 17 Drawing Sheets

RETAINING PIECE FOR AN EARPIECE

TECHNICAL FIELD

The present disclosure relates to the field of in-ear audio devices, more specifically to a retaining piece for an earpiece, an earpiece comprising such a retaining piece and an in-ear audio device comprising at least one earpiece.

BACKGROUND

Users wear earphones with in-ear earpieces while engaging in various types of activity and for extended periods of time (e.g., throughout the day as they commute, work, and exercise). Thus, in-ear earpieces are becoming an ever more important device in users' daily lives. If the in-ear earpieces are worn for an extended time period, this may become uncomfortable for the user. The in-ear earpieces may exert pressure on the ear canal or parts of a user's pinna (e.g., an outer wall of the concha). This can reduce the wearing comfort in some situations. On the other hand, some retaining force may be required such that the worn in-ear earpiece stays in place during various daily activities such as exercise and work. Given use and popularity of in-ear earpieces, it is desirable to provide earpieces that sit comfortably and reliably in a user's ear.

SUMMARY

The present disclosure relates to a retaining piece for an earpiece of an in-ear audio device, a kit of parts, an earpiece of an in-ear audio device and in-ear audio device according to the independent claims. Advantageous embodiments are recited in the dependent claims.

In an aspect, a retaining piece includes a retainer portion, a tubular wall portion, and a cantilevered portion. The tubular portion extends around a central axis that extends through the center of the retaining piece. The retaining piece also includes a locking feature that includes a first alignment feature arranged along the tubular wall portion in direction substantially parallel to the central axis.

Implementations may include one of the following features, or any combination thereof.

In some implementations, the first alignment feature is arranged at a position that is substantially aligned with a location of a maximum radius of the retaining piece.

In certain implementations, the cantilevered portion includes a first cantilevered sub-portion and a second cantilevered sub-portion.

In some cases, the retainer portion includes a first end and a second end, which is substantially opposite the first end. The first end is configured to be more medial (i.e., closer to the user's head, ear canal and/or floor of the concha) than the second end when the retaining piece is worn by a user. The first alignment feature may be disposed along the second end of the retainer portion.

In certain cases, the first alignment feature includes an alignment key that extends outwardly from the second end of the retainer portion.

In some examples, the first alignment feature includes an alignment notch extending from the second end toward the first end.

In certain examples, the cantilevered portion is coupled to the retainer portion between the first end and the second end.

In some implementations, the cantilevered portion includes a coupling edge and a fee edge, which is substantially opposite the coupling edge. The cantilevered portion is coupled to the retainer portion at the coupling edge. The coupling edge is arranged closer to the first end than to the second end. The free edge is arranged between coupling edge and second end.

In certain implementations, the cantilevered portion includes a convexly curved section between the coupling edge and the free edge.

In some cases, the retaining piece is configured such that the coupling edge is more medial than the free edge when the retaining piece is worn by a user.

In certain cases, the cantilevered portion defines a trough shape. The trough shape is formed by the cantilevered portion and an outer circumferential surface of the retainer portion.

In some examples, a bottom of the trough shape is more medial than an opening of the trough shape when the retaining piece is worn by a user.

In certain examples, the cantilevered portion is configured to engage with at least a part of an outer wall of a concha of a user's pinna.

In some implementations, the cantilevered portion extends over about 30% to 70% of a total circumference of the retainer portion.

In certain implementations, the cantilevered portion includes a first cantilevered portion that is shaped to flexibly fit under the antitragus of a wearer's ear when the retaining piece is worn, and a second cantilevered portion that is shaped to flexibly fit under the antihelix of the wearer's ear when the retaining piece is worn. A first side of the first cantilevered portion is primarily on a first plane and a first side of the second cantilevered portion is primarily on a second plane different than the first plane.

Another aspect features an earpiece that includes the retaining piece and a housing that is configured to be coupled to the retaining piece. The housing includes a second alignment feature that is configured to align with the first alignment feature on the retaining piece the ensure a specific orientation of the cantilevered portion of the retaining piece with respect to the housing.

In some implementations, the first alignment feature includes an alignment key that extends outwardly from the second end of the retainer portion and the second alignment feature comprises an alignment notch that is configured to receive the alignment key.

In certain implementations, the first alignment feature includes an alignment notch extending from the second end toward the first end and the second alignment feature includes an alignment key that is configured to engage the alignment notch.

In some cases, the housing also includes a groove that is configured to receive the tubular wall portion of the retaining piece.

In certain cases, the groove extends about an outer circumference of the housing.

Additional details and features are described in reference to the drawings as follows.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

DETAILED DESCRIPTION

Embodiments of the retaining piece, the kit of parts, the in-ear earpiece and the in-ear audio device will be described in reference to the drawings as follows. All examples and features mentioned herein can be combined in any technically possible manner. Other features, objects, and advantages will become apparent from the following detailed description, when read in connection with the following drawing. The illustrated retaining pieces and earpieces are shown to engage with a user's right ear. A retaining piece and an earpiece that is configured to engage with the user's left ear is a mirror image of the retaining piece and earpiece described herein and operates according to the same principles.

Figure 1A:
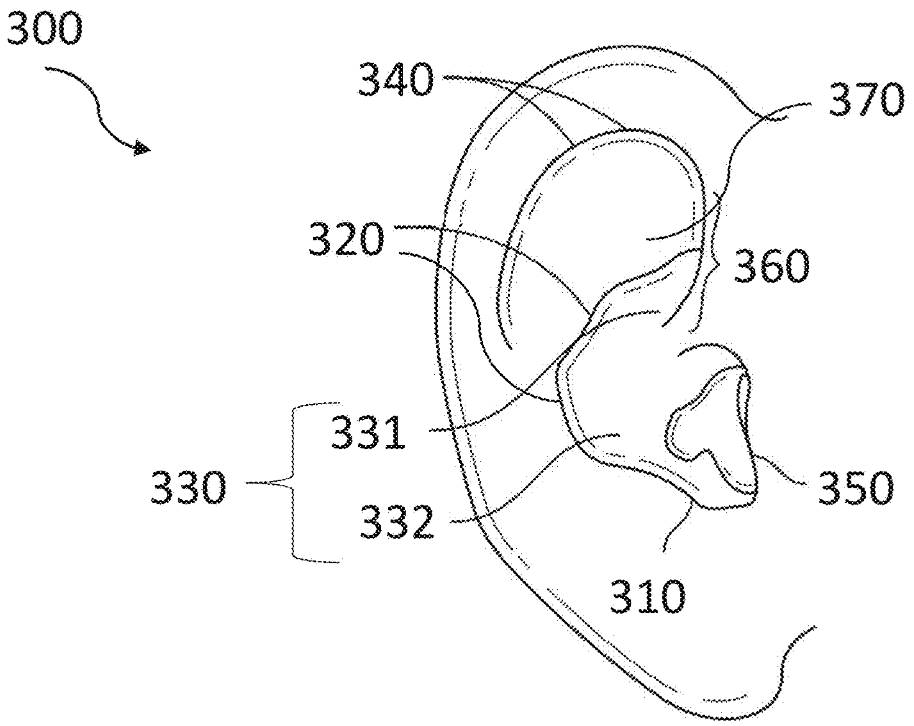
FIG. 1A is a view of the lateral surface of a human ear.

FIGS. 1A to IC show anatomical regions of a right human ear with some features identified. The human ear comprises an outer ear, a middle ear and an inner ear 380. The outer ear or external ear is also known as auricle or pinna 300. It should be noted that there are many different ear sizes and geometries. As an example, a child may have a smaller ear, having smaller sizes and geometric dimensions as compared to an adult's ear. Some ears may have additional features not shown in FIG. 1A, or some ears may lack some of the features shown in FIG. 1A. Some features may be more or less pronounced than shown in FIG. 1A.

The pinna 300 is an almost rudimentary, usually immobile shell that lies close to the side of the human's head. It comprises a thin plate of elastic cartilage covered by closely adherent skin. The cartilage is molded into clearly defined hollows, ridges, and furrows that form an irregular shallow funnel. The deepest depression, which leads directly to the external ear canal 390, or acoustic meatus, is called the concha 330. The concha 330 comprises the cavum concha 332 (lower concha) and the cymba concha 331 (upper concha). The concha 330 is the fossa bounded by the tragus 350, incisura, antitragus 310, antihelix 320, inferior crus of the antihelix 370, and base of the helix 360. The lower concha 330 is partly covered by two small projections, the tongue-like tragus 350 in front and the antitragus 310 behind. Above the tragus is a prominent ridge, the helix 340, which arises from the floor of the concha 330 and continues as the incurved rim of the upper portion of the pinna. An inner, curved concentric ridge, the antihelix 320, surrounds the concha 330 and separates the helix 340 by a furrow, the scapha and triangular fossa. In detail, the antihelix 320 represents a folding of the conchal cartilage. The outer wall of the concha 330 of the user's pinna 300 may at least partially include the antitragus 310 and/or antihelix 320. In some examples, the outer wall of the concha 330 may be at least partially defined by the ridge provided by antitragus 310 and/or antihelix 320. Optionally, the outer wall of the concha 330 may also include some parts of the tragus 350 and/or the inferior crus of antihelix 370 (or a ridge provided by these parts). The stem (the part below the bifurcation) of the normal antihelix 320 is gently curved and branches about two thirds of the way along its course to form the broad fold of the superior antihelical crus, and the more sharply folded inferior crus 370. The helix 340 is the outer rim of the ear that extends from the superior insertion of the ear on the scalp (root) to the termination of the cartilage at the earlobe. The earlobe, the fleshy lower part of the pinna 300, is the only area of the outer ear that contains no cartilage. The scapha is the groove between the helix 340 and the antihelix 320 while the tragus 350 is a posterior, slightly inferior, protrusion of skin-covered cartilage, anterior to the ear canal 390.

Figure 1B:
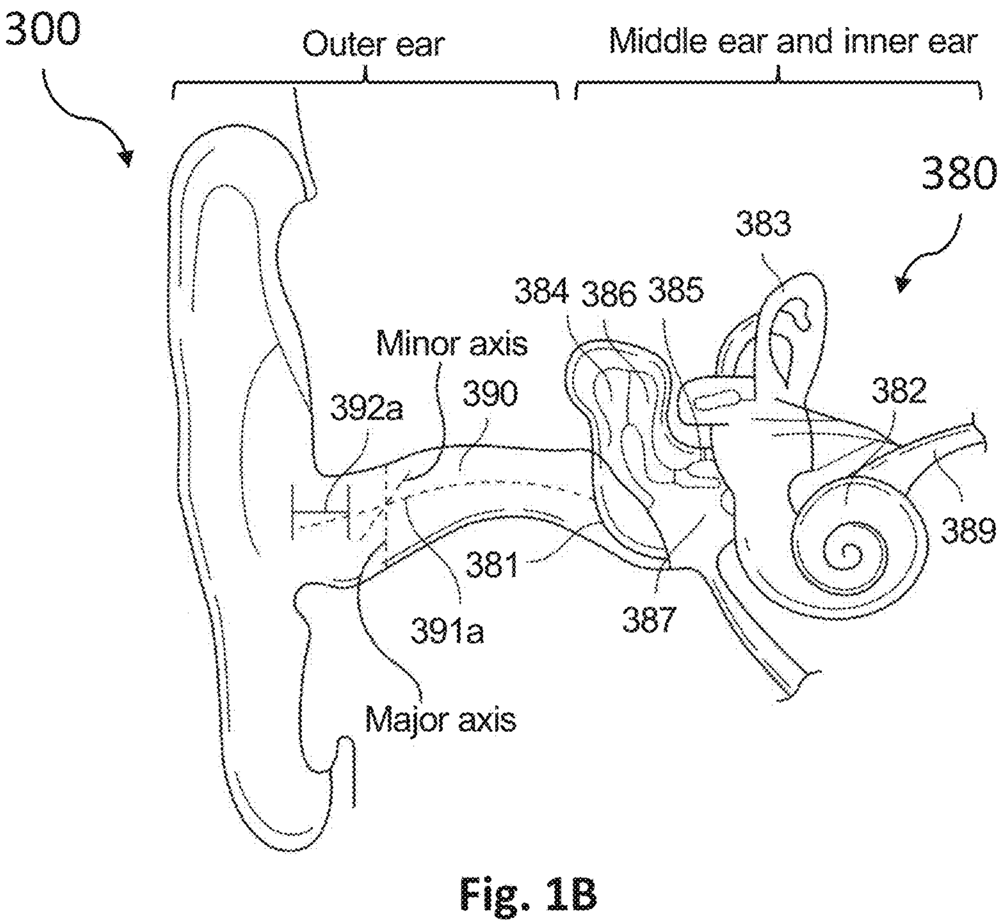
FIGS. 1B and 1C are exemplary cross-sections of the human ear.
Figure 1C:
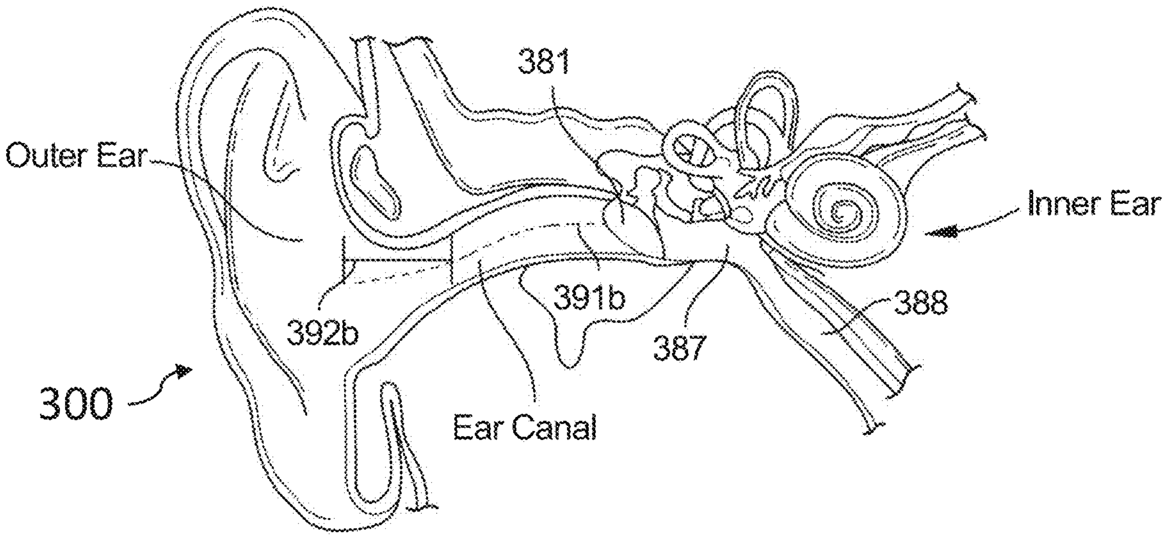

As shown in FIGS. 1B and 1C, the external ear canal 390 is a slightly curved tube that extends inward from the floor of the concha 330 and ends blindly at the tympanic membrane 381. In other words, the ear canal 390 is an irregularly shaped cylinder with a variable cross-sectional area and a centerline that is not straight. In its outer third, the wall of the canal consists of cartilage; in its inner two-thirds, of bone. The entire length of the passage, which may be up to approximately 24 mm, is lined with skin, which also covers the outer surface of the tympanic membrane. The skin of the ear canal is very sensitive to pain and pressure. In this description, the entrance to the ear canal 390 refers to the portion of the ear canal near the floor of the concha 330 where the walls of the ear canal 390 are substantially non-parallel to the centerline 391*a* of the ear canal 390. The precise structure of the human ear varies widely from individual to individual. For example, in the cross section of FIG. 1B, there is a relatively sharp transition from ear canal walls that are not parallel to a centerline 391*a* of the ear canal 390 to walls that are substantially parallel to a centerline of the ear canal 390, such that an entrance area 392*a* to the ear canal 390 is relatively short. In the cross-section of FIG. 1C, there is a more gradual transition from ear canal walls that are non-parallel to a centerline 391*b* of the ear canal 390 to walls that are substantially parallel to a centerline 391*b* of the ear canal 390, such that the entrance 392*b* to the ear canal 390 is relatively long.

The thin semitransparent tympanic membrane, or eardrum, forms the boundary between the outer ear and the middle ear, is stretched obliquely across the end of the external ear canal 390. The cavity of the middle ear is a narrow air-filled space which comprises the tympanic cavity 387. Crossing the middle-ear cavity is the short ossicular chain formed by three tiny bones that link the tympanic membrane 387 with an oval window and inner ear. From the outside inward they are the malleus (hammer) 384, the incus (anvil) 386, and the stapes (stirrup) 385. These bones are suspended by ligaments, which leave the chain free to vibrate in transmitting sound from the tympanic membrane to the inner ear 380. The middle ear further comprises the eustachian tube 388 which helps to ventilate the middle ear and maintain equal air pressure on both sides of the tympanic membrane. Amongst others, the inner ear comprises the semicircular canals 383, vestibular nerve, cochlea 382 and cochlear nerve 389.

Figure 4A:
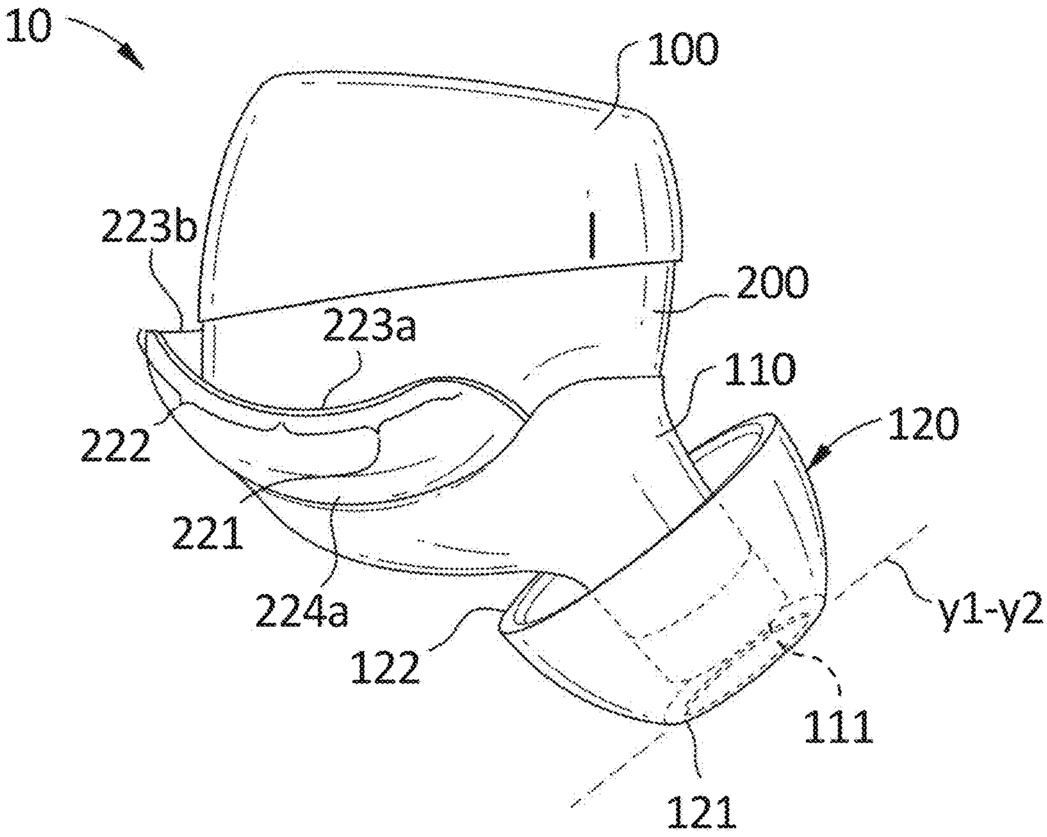
FIG. 4A is a side perspective view of a second embodiment of the in-ear earpiece including the retaining piece, housing, nozzle and ear tip, according to aspects of the present disclosure.
Figure 4B:
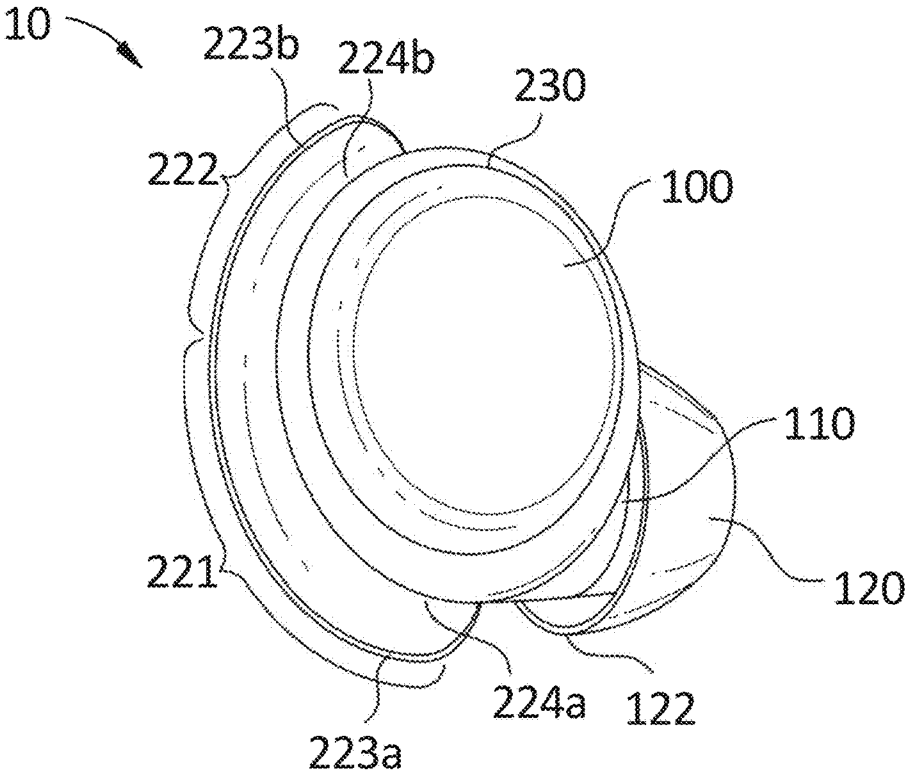
FIG. 4B is a rear view of the second embodiment of the earpiece as shown in FIG. 4A.
Figure 4C:
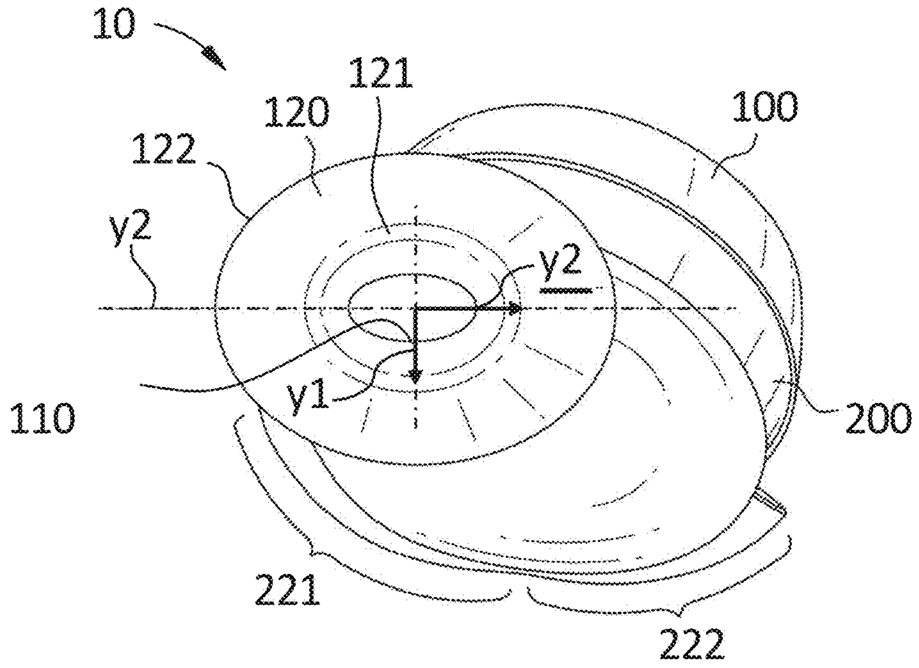
FIG. 4C is a front view of the nozzle attached to the second embodiment of the earpiece as shown in FIG. 4A.

FIGS. 2A to 2D show different views of a first embodiment of an in-ear earpiece 10 and FIGS. 4A to 4C illustrate different views of a second embodiment of the earpiece 10. The features described below in relation to the first embodiment may apply to the second embodiment, and vice versa. Also, other non-described embodiments fall within the scope of the present invention, as long as they implement the claimed features. The earpiece 10 may be comprised with an in-ear audio device. The earpiece 10 comprises a housing 100 configured to engage with at least a part of a user's ear, more specifically with the ear canal 390 and/or a part of the user's pinna 300. The earpiece 10 further comprises a retaining piece 200, wherein the retaining piece 200 is coupled to the housing 100. Such an earpiece 10 may lead to a design that is comfortable, creates a gentle seal to facilitate noise reduction, spread contact evenly across the user's ear (optionally the ear canal 390 and/or parts of the pinna 300) to avoid pressure points, and help provide consistent acoustic performance while maximizing noise reduction.

A first embodiment of the retaining piece 200 will be described below with reference to FIGS. 2A to 3G and a second embodiment of the retaining piece 200 will be described below with reference to FIGS. 4A to 6B. As shown, e.g., in FIG. 3A, the retaining piece 200 comprises a retainer portion 210 and a cantilevered portion 220. The cantilevered portion 220 comprises a coupling edge 224 and a free edge 223 which is substantially opposite the coupling edge 224. The cantilevered portion 220 is coupled to the retainer portion 210 at the coupling edge 224. The cantilevered portion 220 is configured to engage with at least a part of an outer wall of a concha 330 of a user's pinna 300, as will be described in detail below. The cantilevered portion 220 comprises a convexly curved section between the coupling edge 224 and the free edge 223. When the cantilevered portion 220 is in an engaged state, the coupling edge 224 is more medial than the free edge 223. The retaining piece 200 is configured to be coupled to the housing 100 of the earpiece 10, optionally by means of the retainer portion 210. Such a retaining piece 200 may comfortably retain an earpiece 10 in a user's ear (in embodiments, in a user's ear canal 390 and/or parts of a user's pinna 300). The retaining piece 200 may provide orientation and stability without excessive radial pressure against parts of the user's pinna 300, as will be explained in detail below. Orientation may help to ensure that the earpiece 10 is properly engaged with the user's ear. Achieving stability can refer to the earpiece 10 staying in the user's ear with minimal movement when properly engaged. The described retaining piece 200 may lead to the advantage of enabling an earpiece to be worn comfortably in the user's ear for long periods of time, and also improving a fit or retention of the earpiece 10 in a user's ear during various activities.

An imaginary medial line (e.g., a midline) may extend through the middle (or center) of a human's body, extending along its length. A lateral orientation is a position away from the medial line of the body. For instance, the arms are lateral to the chest, and the pinnae 300 are lateral to the head. A medial orientation is a position toward the medial line of the body. An example of medial orientation is the eyes, which are medial to the ears (e.g., the pinnae 300) on the head. In this context, anterior means toward the front (towards the chest of a human) viewed from the medial line, and posterior means toward the back (of a human) viewed from the medial line. As defined above, when the retaining piece 200, more specifically the cantilevered portion 220, is engaged, the coupling edge 224 is more medial than the free edge 223. In other words, when engaged, the coupling edge 224 is closer to the inner ear 380 and/or medial line of a human's body than the free edge 223. It should be noted that the definition of "medial" may apply to a user who has average ears (more detailed, the outer ear; e.g., pinna, concha, concha floor) that are approximately parallel or only slightly inclined with respect to the medial line. However, there may be other ears (in detail, outer ears) having different geometries, that may be greater inclined to the medial line. In this case, the definition of "the coupling edge 224 is more medial than the free side 223" (and all other definitions with respect to "medial" in the present disclosure) may apply for different radial or circumferential positions (in the r-x plane) of the coupling edge 224 and associated circumferential positions of the free edge 223 with respect to the direction of the central axis x. However, the general idea that the coupling edge 224 is closer (or more medial) to the inner ear 380 and/or medial line of a human's body than the free edge 223 still applies in this case, even if slightly less.

Figure 2A:
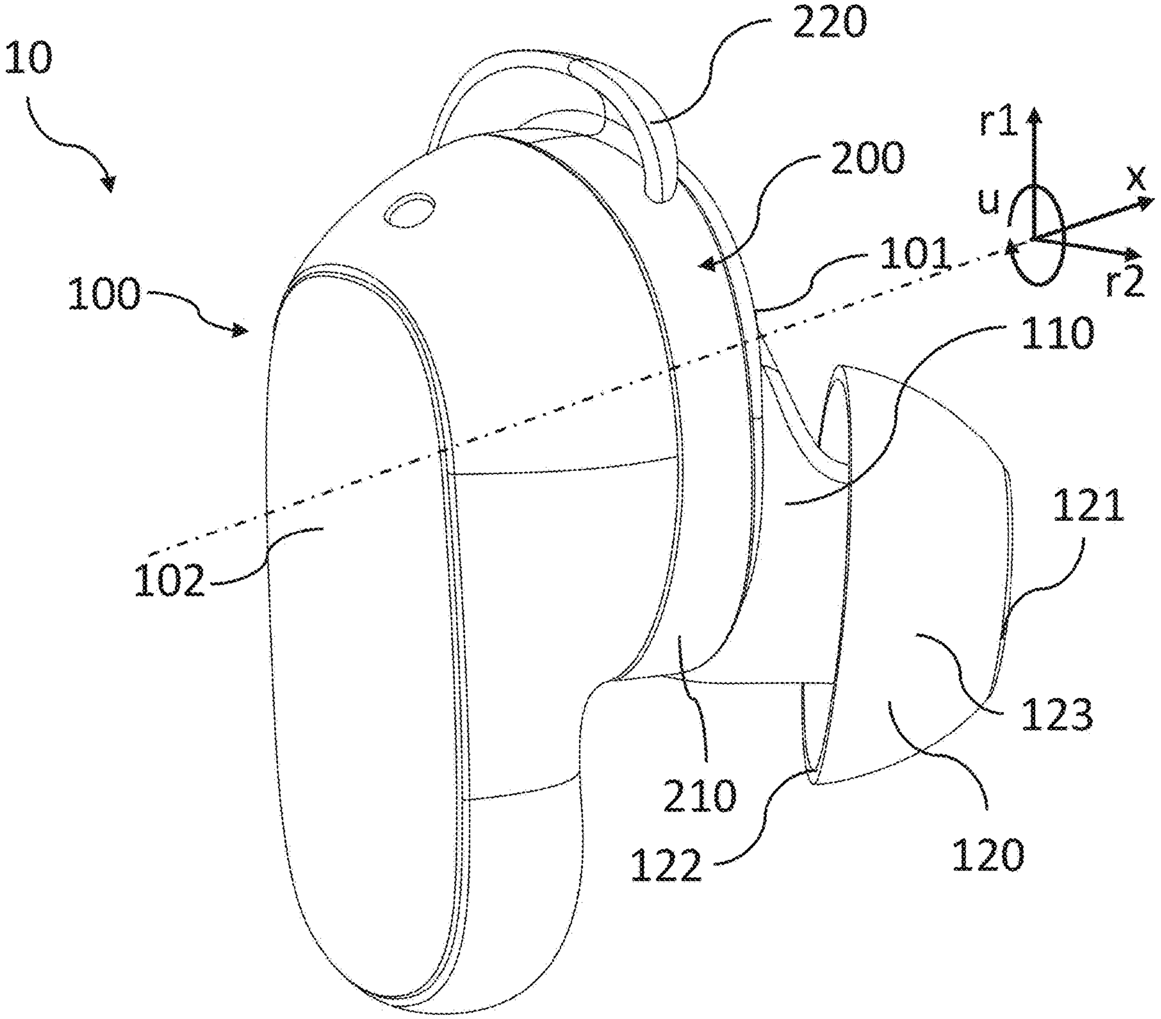
FIG. 2A is a side perspective view of a first embodiment of the in-ear earpiece including the retaining piece, housing, nozzle and ear tip, according to aspects of the present disclosure.
Figure 3A:
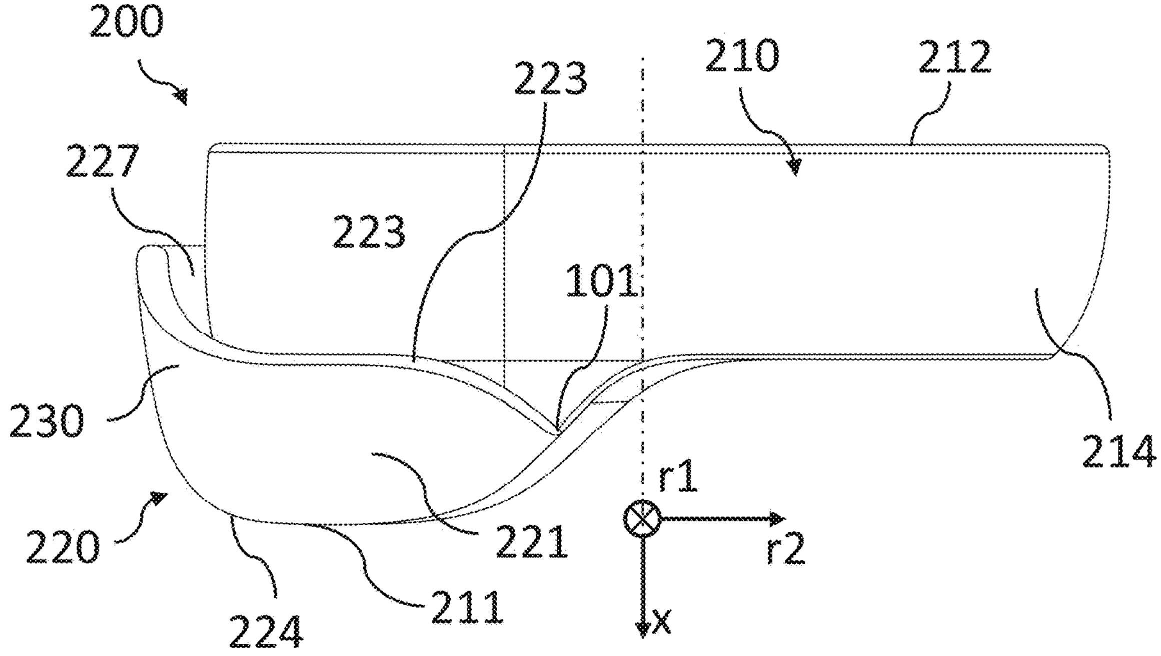
FIG. 3A is a side view of the first embodiment of the retaining piece according to aspects of the present disclosure.
Figure 3B:
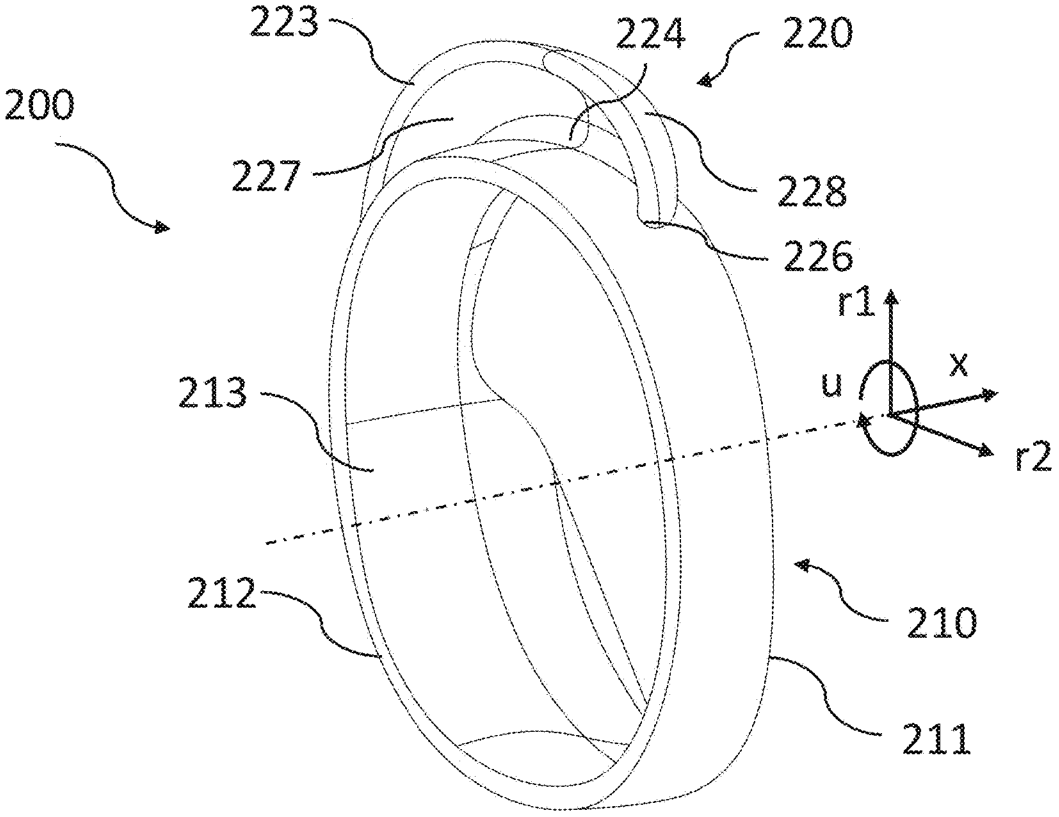
FIG. 3B is a side perspective view of the first embodiment of the retaining piece as shown in FIG. 3A.

Referring to FIGS. 2A and 3B, a coordinate system is defined for the retaining piece 200 which may also be applied for the earpiece 10. The retaining piece 200 comprises a central axis x, extending through the center of the retaining piece 200, a radial axis r extending perpendicular to the central axis x in a radial direction of the retaining piece 200, and a circumferential axis u extending in the circumferential direction of the central axis x. The radial axis r may define a first radial direction r1 and a second radial direction r2, wherein the second radial direction r2 extends perpendicular to the first radial direction r1. In other words, the radial axis r may define a random radial direction of the retaining piece, extending from the central axis x. The center and the associated central axis x may be the geometric center of the retainer portion 210. The first radial direction r1 may extend in a radial direction, in which the retaining piece 200 comprises its maximum radius Rmax, measured from the central axis x to an outer contour 240 of the retaining piece 200.

As mentioned above, the retaining piece 200, particularly the cantilevered portion 220, can be in an engaged state or in a disengaged state. The cantilevered portion 220 is in a disengaged state, when there is no contact between the cantilevered portion 220 and the outer wall of the concha 330 of a user's pinna 300. In other words, in the disengaged state, the retaining piece 200 is not used, i.e., no external forces act on the retaining piece 200 (particularly on the cantilevered portion 220) and/or no forces are applied on the retaining piece 200. This is particularly the case when the retaining piece 200 is not engaged with an outer wall of a user's concha 330. The cantilevered portion 220 may be in the engaged state, when the retaining piece 200 is at least partially engaged with a user's concha 330, more specifically when the retaining piece 200 is inserted into a user's concha cavity, and wherein at least a part of the cantilevered portion 220 contacts at least a part of the outer wall of the concha 330 of the pinna 300. In other words, the cantilevered portion 220 may be in the engaged state, when the cantilevered portion 220 at least partially contacts (or engages with) the outer wall of the concha 330 at the antitragus 310 and/or the antihelix 320, and/or at least partially contacts (or engages with) the ridge provided by antihelix 320 and/or antitragus 310. Unless otherwise mentioned, throughout this description, the geometry and characteristics of the retaining piece 200 and the earpiece 10 are described for the disengaged state.

The cantilevered portion 220 extends from the retainer portion 210 radially outwards (i.e., in a radial direction r as defined above). For instance, the coupling edge 224 can be located more inwards in a radial direction r than the free edge 223. When the cantilevered portion 220 is in the engaged state, the coupling edge 224 is more medial than the free edge 223. In other words, when the cantilevered portion 220 is engaged and in the direction of central axis x, the coupling edge 224 is closer to the floor of the concha 330, and/or to the ear canal 390, and/or to the user's head than the free edge 223. The outer wall of concha 330 as defined above can be at least one of the antitragus 310 and the antihelix 320 of the user's pinna. However, in other embodiments, the outer wall may also at least partially include the tragus 350 and the inferior crus of antihelix 370. In other words, the cantilevered portion 220 is slanted in a direction opposite the floor of the concha 330 of the user's pinna 300.

The retainer portion 210 comprises a first end 211 and a second 212, which is substantially opposite the first end 211. This may be defined relative to the direction of the central axis x. The cantilevered portion 220 is coupled to the retainer portion 210 between the first end 211 and the second end 212. As described above, the cantilevered portion 220 is configured to engage with at least a part of an outer wall of a concha 330 of a user's pinna 300. In other words, when the cantilevered portion 220 is engaged and with respect to the direction of central axis x, the first end 211 is more medial (i.e., closer to the user's head, ear canal 390 and/or floor of the concha 330) than the second end 212 (i.e., distal to the user's head, ear canal 390 and/or floor of the concha 330). When engaged, the first end 211 may be closer to a user's ear canal 390, concha floor, inner ear 380, and/or head than the second end 212. The cantilevered portion 220 extends from the retainer portion 210 radially outwards and towards the first end 211 or towards the second end 212. In embodiments, the coupling edge 224 is arranged closer to the first end 211 than to the second end 212, and the free edge 223 is arranged between coupling edge 224 and second end 212, viewed in the direction of the central axis x.

As described above, the cantilevered portion 220 comprises the coupling edge 224 and the free edge 223, the free edge 223 being substantially opposite the coupling edge 224. In other words, the free edge 223 may be the edge of the cantilevered portion 220 that faces away from the cantilevered portion 220 and that is located on a side of the cantilevered portion 220 substantially opposite the side of the cantilevered portion 220 on which the coupling edge 224 extends. In embodiments, particularly in the disengaged state, the free edge 223 may be the edge of the cantilevered portion 220 that is furthest from the coupling edge 224 in the direction of the central axis x (which may apply for some or all circumferential positions of the free edge 223 along its length in circumferential direction u, in the plane r-x). In embodiments, the free edge 223 may face substantially in the direction of the central axis x towards the second end 212. Optionally, the free edge 223 may be the edge that is on an opposite side of the cantilevered portion 220 with respect to the coupling edge 224 and not coupled to the retaining body 210 (however, this may be the case at first and second side edges 225, 226 as described in detail below).

As shown in FIGS. 3A to 3G, the cantilevered portion 220 comprises a first side edge 225 and a second side edge 226, each extending between the coupling edge 224 and the free edge 223 on opposite sides of the cantilevered portion 220. The cantilevered portion 220 comprises an outer cantilevered portion surface 228 substantially facing away from the central axis x in the radial direction r. The outer cantilevered portion surface 228 may be defined between free edge 223 and coupling edge 224, additionally between first side edge 225 and second side edge 226 (i.e., along its entire length 11 as explained below), on a side facing away from the retainer portion 210. The outer cantilevered portion surface 228 is designed to at least partially follow a contour of the outer wall of the concha 330 (e.g., the outer contour or curved shape of antihelix 320 and/or antitragus 310), in particular when the cantilevered portion 220 is in the engaged state. Furthermore, the cantilevered portion 220 comprises an inner cantilevered portion surface 227, which is on an opposite side of the outer cantilevered portion surface 228 and oriented towards an outer circumferential surface 214 of the retainer portion 210.

Figure 3C:
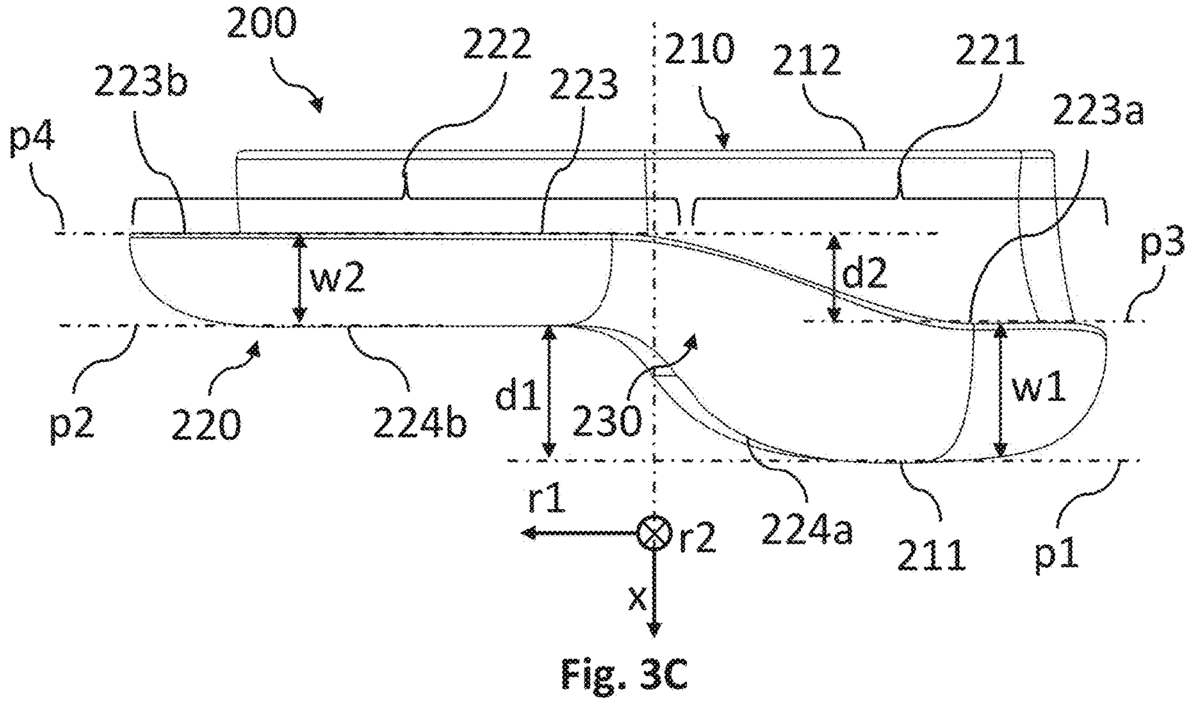
FIG. 3C is a side view of the first embodiment of the retaining piece, turned by 90° in the circumferential direction with respect to FIG. 3A.
Figure 3D:
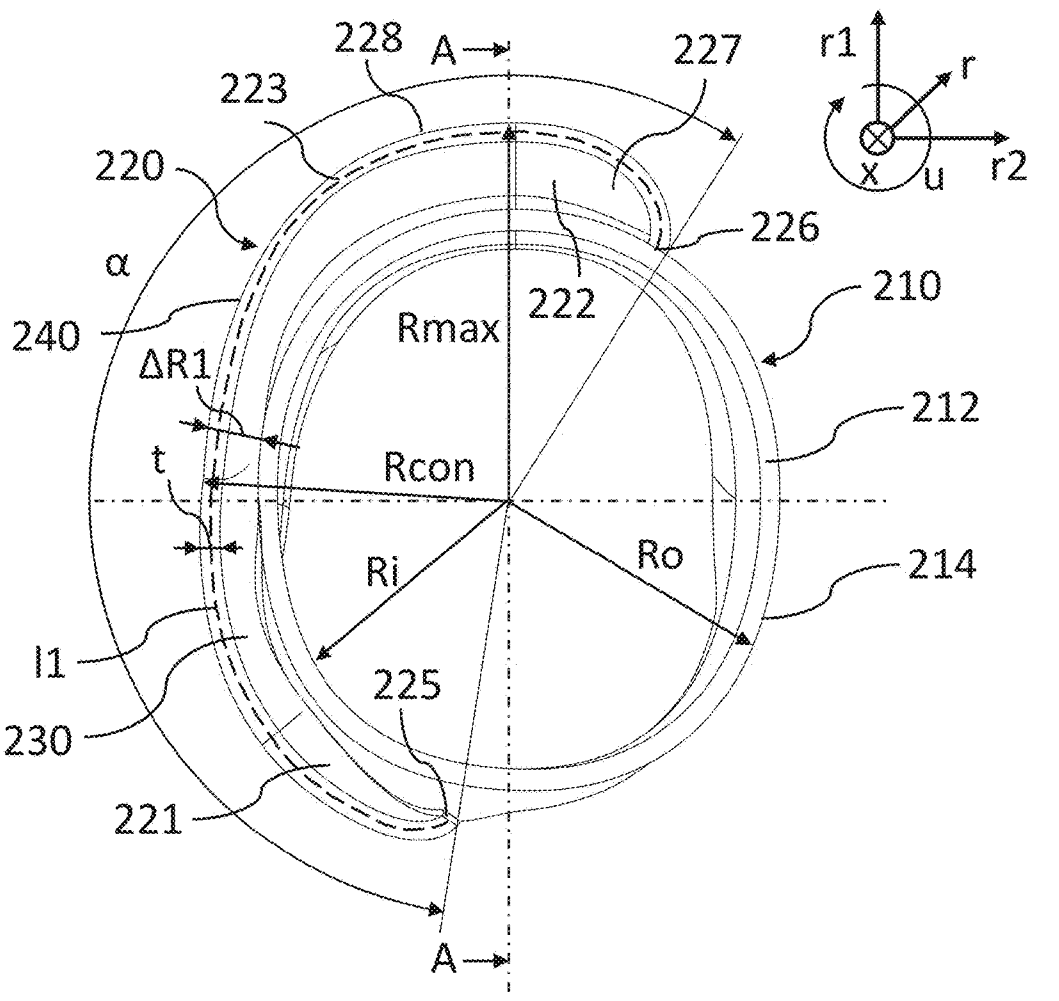
FIG. 3D is a bottom view of the first embodiment of the retaining piece according to aspects of the present disclosure.
Figure 3E:
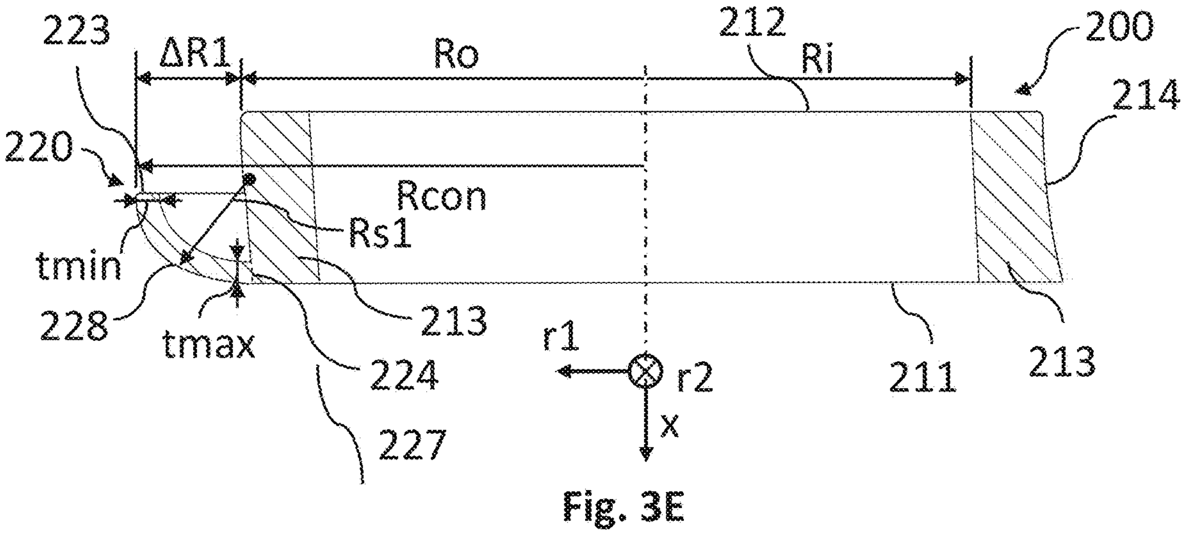
FIG. 3E is a cross-sectional side view of the first embodiment of the retaining piece, cut at position A-A as shown in FIG. 3D, showing the cantilevered portion in a disengaged state.
Figure 3F:
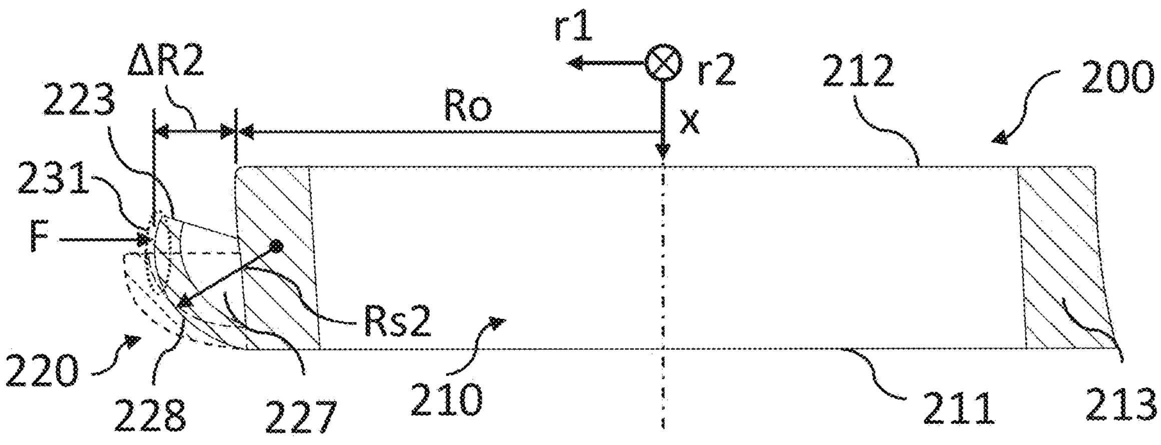
FIG. 3F is a cross-sectional side view of the first embodiment of the retaining piece, cut at position A-A as shown in FIG. 3D, showing the cantilevered portion in an engaged state.
Figure 3G:
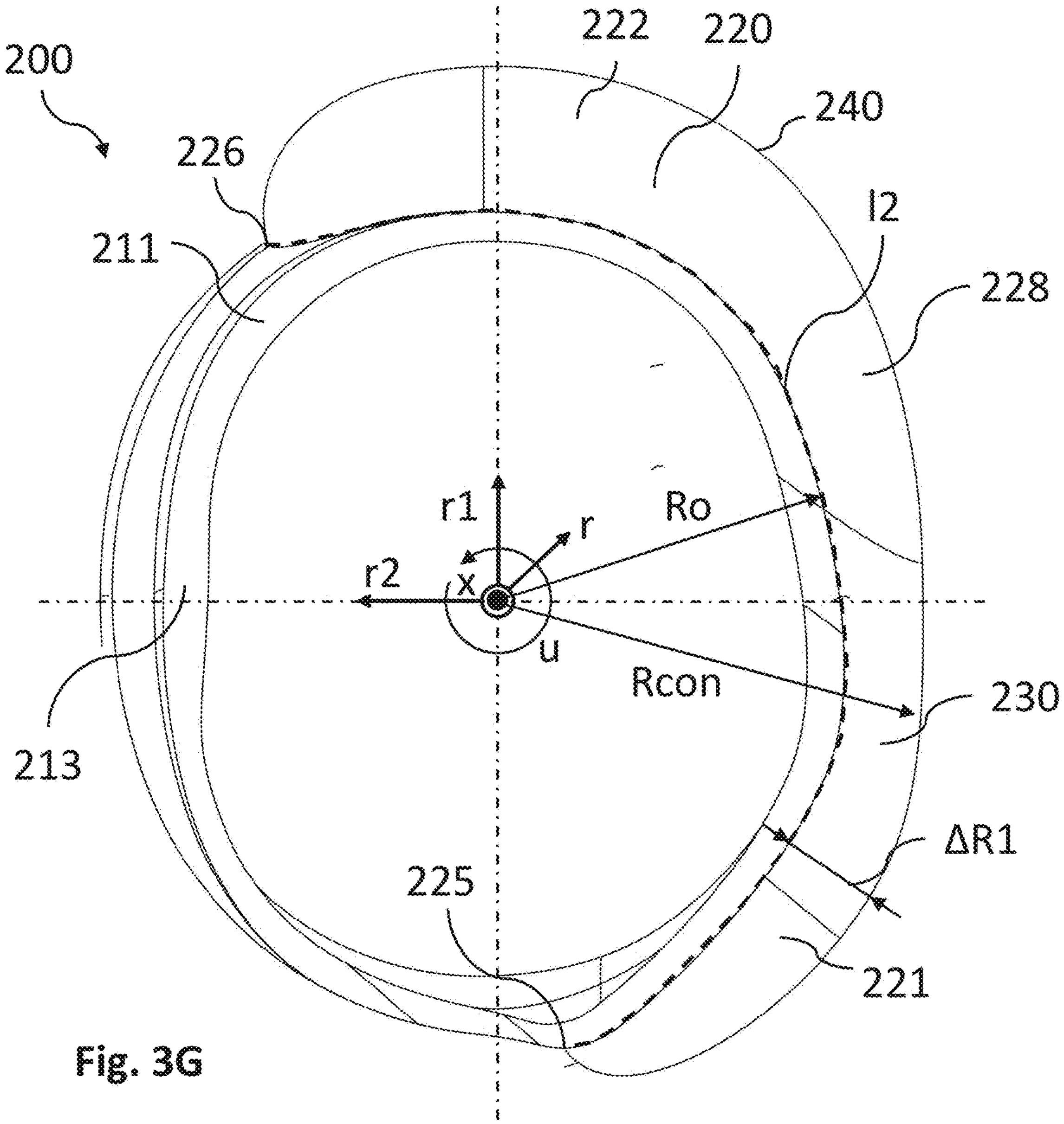
FIG. 3G is a top view of the first embodiment of the retaining piece according to aspects of the present disclosure.

Referring to FIGS. 3D and 3G, the cantilevered portion 220 is coupled to (or extends from) the retainer portion 210 at least partially about the outer circumferential surface 214 of the retainer portion 210 in the circumferential direction u. In some examples, the cantilevered portion 220 is coupled (or extends) over a length 11 about the outer circumferential surface 214 of the retainer portion 210 substantially in the circumferential direction u. The length 11 may be measured in the circumferential direction u along the free edge 223, more specifically between first side edge 225 and second side edge 226. In embodiments, the cantilevered portion 210 extends over about 30% to 70%, more specifically 40% to 60%, of a total circumference of the retainer portion 210. As best shown in FIG. 3D, in a plane r1-r2 defined by first radial direction r1 and second radial direction r2, the cantilevered portion 220 extends about the outer circumferential surface 214 of the retainer portion 210 over an angle α which can be between $120° < \alpha < 270°$, more specifically between $150° < \alpha < 250°$, in particular between $170° < \alpha < 240°$, measured in the circumferential direction u. In detail, angle α is measured at the free edge 223 between first side edge 225 and second side edge 226. The free edge 223 extends substantially parallel to the coupling edge 224 in the circumferential direction u and over a majority of length 11. However, in other embodiments, the coupling edge 224 may extend at least partially substantially parallel to the free edge 223. Furthermore, in a plane defined by first radial direction r1 and second radial direction r2, the free edge 223 may extend, at least partially along its length 11, parallel to the outer circumferential surface 214 of the retainer portion 210.

Referring to FIGS. 3A to 3G, the coupling edge 224 extends, over a majority of its length 12, along the first end 211 in the circumferential direction u. The length 12 is measured along the coupling edge 224 between first side edge 225 and second side edge 226 in the circumferential direction u. In embodiments, the coupling edge 224 and/or the free edge 223 may extend linearly in the circumferential direction u over a majority of length 11 of the cantilevered portion 220. Alternatively, the coupling edge 224 and/or the free edge 223 may comprise a curved shape in the circumferential direction u over a majority of a length 11 of the cantilevered portion 220, optionally a wave-shape. In other words, the coupling edge 224 and/or the free edge 223 may comprise a specific shape in the circumferential direction u. The coupling edge 224, over a majority of its length 12, may be coupled to the retainer portion 210 adjacent the first end 211. In other words, the coupling edge may follow, over a majority of its length 12, the contour of the first end 211 in the circumferential direction u and with respect to the direction of the central axis x. In embodiments, the cantilevered portion 220 is coupled to the retainer portion 210 over the entire length 12 of the coupling edge 224. In detail, the cantilevered portion 220 may be continuously and/or uninterruptedly coupled to the retainer portion 210 over the entire length 12 of the coupling edge 224.

FIGS. 3E and 3F are cross-sectional side views of the first embodiment of the retaining piece 200, cut at position A-A as shown in FIG. 3D, showing the cantilevered portion 220 in the disengaged state (see, FIG. 3E) and showing the cantilevered portion 220 in the engaged state (see, FIG. 3F). As already mentioned above, the cantilevered portion 220 is in the engaged state, when at least a part of the cantilevered portion 220 contacts (at least a part of) the outer wall of the concha 330, optionally at a contact area 231. The contact area 231 may be provided at the free edge 223, and/or between free edge 223 and coupling edge 224 on the outer cantilevered portion surface 228. In embodiments, the cantilevered portion 220 may, when engaged, contact the outer wall of the concha 330 between tragus 350 and inferior crus of helix 370, optionally at least partially at the antitragus 310 and the antihelix 320.

The cantilevered portion 220 is configured to deflect, more specifically to elastically deflect, at least partially along its length 11 in the circumferential direction u, in radial direction r towards the central axis x and/or in the direction of the central axis x, in response to a force F applied on the cantilevered portion 220. The force F is at least partially applied on the cantilevered portion 220 by the part of the outer wall of the concha 330 contacting the cantilevered portion 220, optionally at the contact area 231, when the retaining piece 200 is in the engaged state.

As shown in FIG. 3F, when the cantilevered portion 220 is in the engaged state, at least a part of the cantilevered portion 220 that contacts the outer wall of the concha 330 may deflect towards the central axis x, and/or wherein at least a part of the cantilevered portion 220 may deflect towards the first end 211 or towards the second end 212. In other words, at least a part of the cantilevered portion 220 may fold or roll up on itself towards the central axis x, when the retaining piece 200 is at least partially inserted in the concha cavity. When the cantilevered portion 220 deflects or folds or rolls up on itself, the free edge 223 may be moved towards the coupling edge 224, more specifically wherein a distance between coupling edge 224 and free edge 223 may be smaller than in the disengaged state. However, in other embodiments, when deflected, the free edge 223 may be moved away from the coupling edge 224. When inserting the retaining piece 200 towards a user's concha floor (or towards a user's ear canal 390) in the direction of the central axis x to provide the engagement between retaining piece 200 and pinna 300, optionally between retaining piece 200 and antitragus 310 and/or antihelix 320, a contact may occur between at least a part of the outer wall of the concha 330 (e.g., antitragus and/or antihelix) and the cantilevered portion 220. Thereby, contact force F may act on at least the part of the cantilevered portion 220 that contacts the outer wall of the concha 330. While inserting the retaining piece 200, the contact force F may be larger than in the engaged state. The reason may be, that in the engaged state, a part of the cantilevered portion 220 may at least partially engage with a groove or furrow provided by the antihelix 320 and/or the antitragus 310 (between ridge and concha floor), and thus the deflection of the cantilevered portion 220 may at least partially decrease.

The contact force F may have a first force component that is substantially directed in the radial direction r towards central axis x. Furthermore, force F may have a second force component that is substantially directed in the direction of the central axis x, and/or a third force component that is substantially directed in the circumferential direction u. The cantilevered portion 220 can comprise (e.g., be made of) a polymeric material. As described above, the cantilevered portion 220 may be configured to elastically deflect. Subsequent to a deflection, the cantilevered portion 220 may be moved back to its initial position by a restoring force, optionally by an elastic restoring force. The initial position of the cantilevered portion 220 may be position, in which the cantilevered portion 220 is in the disengaged state. In the engaged state, the restoring force can act at least partially opposed to the contact force F. If the contact force F is larger than the elastic restoring force, the deflection of the cantilevered portion 220 (in detail, of the part being in contact with the outer wall) may occur. In other words, the cantilevered portion 220 may provide a spring effect. The restoring force depends on the stiffness of the material used for the cantilevered portion 220. The stiffness results from the modulus of elasticity of the material, the specific geometry of the cantilevered portion 220 and the cross-sections of the material, as well as from the processing of the material. The stiffness of the cantilevered portion 220 may also differ for deflections in different directions. For example, the stiffness of the material for a deflection towards the central axis x may be lower than in the circumferential direction u. In the engaged state, the opposed forces (contact force F and elastic restoring force) may lead to a better retention of the retaining piece 200 in the concha 330. In other words, the opposing forces cause the cantilevered portion 220 to exert pressure on the outer wall. The cantilevered portion 220 may apply pressure to the outer wall of the concha 330 of the pinna 300 at least partially along antitragus 310 and/or antihelix 320. However, it should be noted that the pressure applied by the retaining piece 200 on the outer wall of the concha 330 may be reactive in order to compensate (or balance) force F, rather than proactive in order to intentionally affect the shape of the outer wall of the concha 330. In embodiments, the cantilevered portion 220 may apply pressure along the antitragus 310 and at least a lower portion of the antihelix 320 (which is adjacent the antitragus). As a result, the retaining piece 200 may create stability and may at least slightly push the earpiece 10 towards the user's ear canal 390, when the earpiece 10 is worn. If the forces are distributed over a larger contact area 231 between the cantilevered portion 220 and the outer wall of the concha 330, this may lead to improved comfort (due to reduced pressure) over a longer period of time when the retaining piece 200 (and the earpiece 10) is worn by a user.

When the retaining piece 200 changes from the disengaged state to the engaged state (i.e., when the retaining piece is inserted in a user's concha 330 and the cantilevered portion 220 contacts the outer wall of the concha 330), the second force component may be directed towards the second end 212 (as shown, e.g., in FIG. 3F), or towards the first end 211. The resulting force component of first force component and second force component may lead to the deflection of the part of cantilevered portion 220 as shown in FIG. 3F. In this case, at least a part of the free edge 223 (and the associated parts of the cantilevered portion 220) may move (or fold) axially towards first end 211 or towards the second end 212, and radially towards the central axis x (and/or towards the retainer portion 210). However, in other embodiments, at least a part of the free edge 223 may move (or fold) radially towards the central axis x (and/or towards the retainer portion 210) without moving towards the first end 211 or towards the second end 212. When the retaining piece 200 changes from the engaged state to the disengaged state (i.e., when the retaining piece is removed from the user's concha 330), the second force component may be substantially directed in the direction of the central axis x towards the first end 211 or towards to the second end 212.

As shown, e.g., in FIGS. 3A to 3C and FIGS. 3E to 3F, the cantilevered portion 220 comprises a convexly curved section between coupling edge 224 and free edge 223. In some embodiments, the convexly curved section may be defined in a cross-sectional plane r-x defined by radial axis r and central axis x. The cantilevered portion 220 comprises the convexly curved section viewed from the central axis x in the direction of the radial axis r. In other words, the convexly curved section is defined with respect to a position on the central axis x, viewed in the radial direction r. The convexly curved section allows the free edge 223 of the cantilevered portion 220 to gently deflect, more specifically to fold or roll up on itself, towards the central axis x and/or towards the retainer portion 210 when the cantilevered portion 220 at least partially contacts the outer wall of the concha 330, optionally the antitragus 310 and/or antihelix 320, of the user's pinna 300. In this manner, the retaining piece 200 may retain an earpiece 10 for a wide range of ear geometries and sizes. If a user has a larger ear, less of the length 11 of the cantilevered portion 220 may roll up towards the retainer portion 210 when the earpiece 10 is engaged with a user's ear. If a user has a smaller ear, more of the length 11 of the cantilevered portion 220 may roll up towards the retainer portion 210 when the cantilevered portion 220 at least partially contacts the antitragus 310 and antihelix 320. In both cases, however, the same retaining piece 200 may comfortably provide stability to keep the earpiece 10 in place and properly oriented and may offer at least slight resistance when the user removes the earpiece 10 by pulling the earpiece 10 away from the ear canal 390. However, it should be understood that different sizes (having different geometries associated with a smaller ear and a larger ear) of retaining pieces 220 may additionally or alternatively be provided, as will be explained below.

In embodiments not shown in the Figs., in a plane r-x defined by radial axis r and central axis x, and starting from the coupling edge 224 towards the free edge 223, the cantilevered portion 220, optionally the outer cantilevered portion surface 228, may comprise the convexly curved section, followed at least in part by a flat section, particularly wherein the flat section may extend substantially parallel to the central axis x or slightly inclined away from the central axis x (i.e., away from the outer circumferential surface 214 of the retainer portion 210 in the radial direction r). The partially flat section can be provided at the contact area 231, where the cantilevered portion 220 contacts the outer wall of the concha 330 of the user's pinna 300 in the engaged state. In other words, the flat section may be adapted to at least partially follow a contour of the outer wall of the concha 330. The flat section may be provided at least partially along the length 11 of the cantilevered portion 220 between first side edge 225 and second side edge 226 substantially in the circumferential direction u. In embodiments, the flat section may be provided over a majority of length 11, or over the entire length 11 of the cantilevered portion 220 in the circumferential direction u between first side edge 225 and second side edge 226. The inclination of the flat section with respect to the central axis x (or the outer circumferential surface 214) may vary along the length 11, or may be substantially constant over a majority of length 11 of the cantilevered portion 220 in the circumferential direction u between first side edge 225 and second side edge 226. A width of the flat section may be measured between the convexly curved section and the free edge 223, parallel to the outer cantilevered portion surface 228 for different radial positions of the cantilevered portion 220. In embodiments, the flat section width of the cantilevered portion 220 may vary along the length 11, or may be substantially constant over a majority of length 11 in the circumferential direction u between first side edge 225 and second side edge 226.

As stated above, the cantilevered portion 220 comprises the convexly curved section. However, in other embodiments not shown in the Figs., the cantilevered portion 220 may comprise a concavely curved section, viewed from the central axis x in the radial direction r, or, a convexly curved section and a concavely curved section. In an embodiment, in a plane r-x defined by radial axis r and central axis x, and starting from the coupling edge 224 towards the free edge 223, the cantilevered portion 220 may comprise the concavely curved section followed by the convexly curved section and/or the flat section. In still other embodiments, the cantilevered portion 220 may, with respect to the direction and plane as defined above, comprise the concavely curved section, followed by the convexly curved section and followed by the flat section (or vice versa).

As best shown in FIG. 3E, in a disengaged state of the cantilevered portion 220, the cantilevered portion 220 having the convexly curved section may comprise a first curved section radius Rs1 measured between coupling edge 224 and free edge 223 in a plane r-x defined by the radial direction r and central axis x. It should be noted that the first curved section radius Rs1 may vary in the described range for different radial cross-sections of the cantilevered portion 220 along its length 11 in the circumferential direction u between first side edge 225 and second side edge 226. In other embodiments, the first curved section radius Rs1 may be substantially constant for different radial cross-sections of the cantilevered portion 220 along its length 11 in the circumferential direction u between first side edge 225 and second side edge 226. The first curved section radius Rs1 may vary for different radial cross-sections of the cantilevered portion 220 between coupling edge 224 and free edge 223 in the r-x-plane. In an embodiment, the first curved section radius Rs1 may be larger at a position close to the coupling edge 224 than at a position close to the free edge 223.

As shown in FIG. 3F, in the engaged state, the convexly curved section may comprise a second curved section radius Rs2 which is smaller than the first curved section radius Rs1. The second curved section radius may be present for the parts of the cantilevered portion 220 that are deflected in the engaged state. The second curved section radius Rs2 may vary for different radial cross-sections of the cantilevered portion 220, optionally along its length 11 in the circumferential direction u between first side edge 225 and second side edge 226. In an embodiment, the second curved section radius Rs2 may be constant along the length 11 of the cantilevered portion 220 in the circumferential direction u. However, this will only be the case if a constant force (or pressure) is applied on the cantilevered portion 220 along the length 11 of the cantilevered portion 220. However, as the cantilevered portion 220 may only at least partially follow the contour of the outer wall of the concha 330, this may not be the case in a standard engaged state. The radius variation between Rs1 and Rs2 may depend, amongst others, on the force applied on the cantilevered portion 220 and the stiffness of the material of the cantilevered portion 220.

As best shown in FIG. 3B, the retainer portion 210 comprises a tubular wall portion 213 extending between the first end 211 and the second end 212. The tubular wall portion 213 defines an outer wall portion radius Ro and an inner wall portion radius Ri, measured in the radial direction r from the central axis x, respectively. In some examples, the outer wall portion radius Ro may be defined between central axis x and outer circumferential surface 214 of the retainer portion 210. The inner wall portion radius Ri may be defined between an inner circumferential surface of the retainer portion 210 and central axis x. In embodiments, the outer wall portion radius Ro may be between 6.0 mm and 12.0 mm, more specifically between 8.0 mm and 10.0 mm, in particular between 8.0 mm and 9.5 mm. The inner wall portion radius Ri may be between 5.0 mm and 11.0 mm, more specifically between 7.0 mm and 9.0 mm, in particular between 7.3 mm and 8.9 mm. The retainer portion 210, more specifically the tubular wall portion 213, may comprise a cross-section in a plane r1-r2 defined by first radial direction r1 and second radial direction r2, that is oval or circular or elliptic. In other embodiments, the retainer portion 210 may comprise a cylindrical shape such that the tubular wall portion 213 may define a substantially circular cross-section. In other embodiments, the tubular wall portion 213 may comprise a gap formed in the tubular wall portion 213 and which may extend through the tubular wall portion 213 between first end 211 and second end 212, optionally in parallel to the central axis x. In this case, however, the gap may be provided at a circumferential position of the retainer portion 210 to which the cantilevered portion 220 is not coupled. In this case, it may be possible to clip the retainer portion 210 to the housing 100.

In the first embodiment and the second embodiment of the retaining piece 200 shown in FIGS. 2A to 6B, the cantilevered portion 220 defines a trough shape. The cantilevered portion 220 (in detail the trough shape) may also be defined as a “scoop” or “flap” that may operate as a spring element to create stability when the earpiece 10 is worn by a user and to hold the earpiece 10 in a user’s ear, and/or push it slightly towards a user’s ear canal 390. The trough shape is formed by the cantilevered portion 220 and the retainer portion 210, more specifically by the cantilevered portion 220 and the outer circumferential surface 214 of the retainer portion 210. In other words, the trough shape may be defined by two substantially opposite side walls (one being the cantilevered portion 220 and one being the outer circumferential surface 214), connected to each other by a bottom. When the cantilevered portion 220 is in the engaged state, the bottom of the trough shape is more medial than an opening of the trough shape. The trough shape may be defined by the opening (or recess) that may be oriented substantially towards the second end 212 and which may be at least partially surrounded by the cantilevered portion 220 and the part of the outer circumferential surface 214 of the retainer portion 210 over which the cantilevered portion 220 extends in the circumferential direction u. The bottom of the trough shape may be closer to the first end 211 than to the second end 212 for every radial position along the length 11 of the cantilevered portion 220 in the circumferential direction u. The bottom of the trough shape may extend adjacent (or at) the coupling edge 224. The free edge 223 may be substantially opposite the bottom of the trough shape, optionally, wherein the free edge 223 is provided between the bottom of the trough shape and the second end 212. In embodiments, the bottom may be formed by the cantilevered portion 220 alone adjacent the coupling edge 224 (e.g., where the bottom extends from the retainer portion 210 directly at the coupling edge 224), or by the retainer portion 210 alone. In other embodiments, the bottom may be formed by the cantilevered portion 220 and by the retainer portion 210. However, in still other embodiments, the trough shape may be formed by the cantilevered portion 220 alone (in particular, by the cantilevered portion 220 comprising the convexly curved section between coupling edge 224 and free edge 223) and coupled to the retainer portion 210, e.g., at the coupling edge 220 or via webs (or struts). In this case, the bottom may be formed at a position between coupling edge 224 and free edge 223 at the convexly curved section.

In the first embodiment of the retaining piece 200 shown in FIGS. 2A to 3G, the cantilevered portion 220 is coupled to the retainer portion 210 at the coupling edge 224, the first side edge 225 and the second side edge 226. In this case, the trough shape is closed at (or between) the first side edge 225 and the retainer portion 210, and between the second side edge 226 and the retainer portion 210. The opening of the trough shape may thus be substantially oriented towards the second end 212 and may be fully surrounded by the cantilevered portion 220 and the part of the outer circumferential surface 214 over which the cantilevered portion 220 extends. In other words, the cantilevered portion 220 may define a closed "scoop" or "flap" structure together with the outer circumferential surface 214 of the retainer portion 210. As shown, e.g., in FIG. 3B, the coupling edge 224 may be curved in the circumferential direction u and the direction of the central axis x towards the free edge 223 at the first side edge 225 and the second side edge 226, respectively. In this configuration, the first side edge 225 and the second side edge 226 can be defined as being integrally formed with the coupling edge 224, or, can be defined as being line-shaped between coupling edge 224 and free edge 225. In other words, in this case the first side edge 225 may define a first end of the free edge 223 and the second side edge 226 may define a second end of the free edge 223. In the embodiments shown in FIGS. 2A to 3G, the free edge 223 is only coupled to the retainer portion 210 at the first side edge 225 (or first end) and the second side edge 226 (or second end).

Figure 6A:
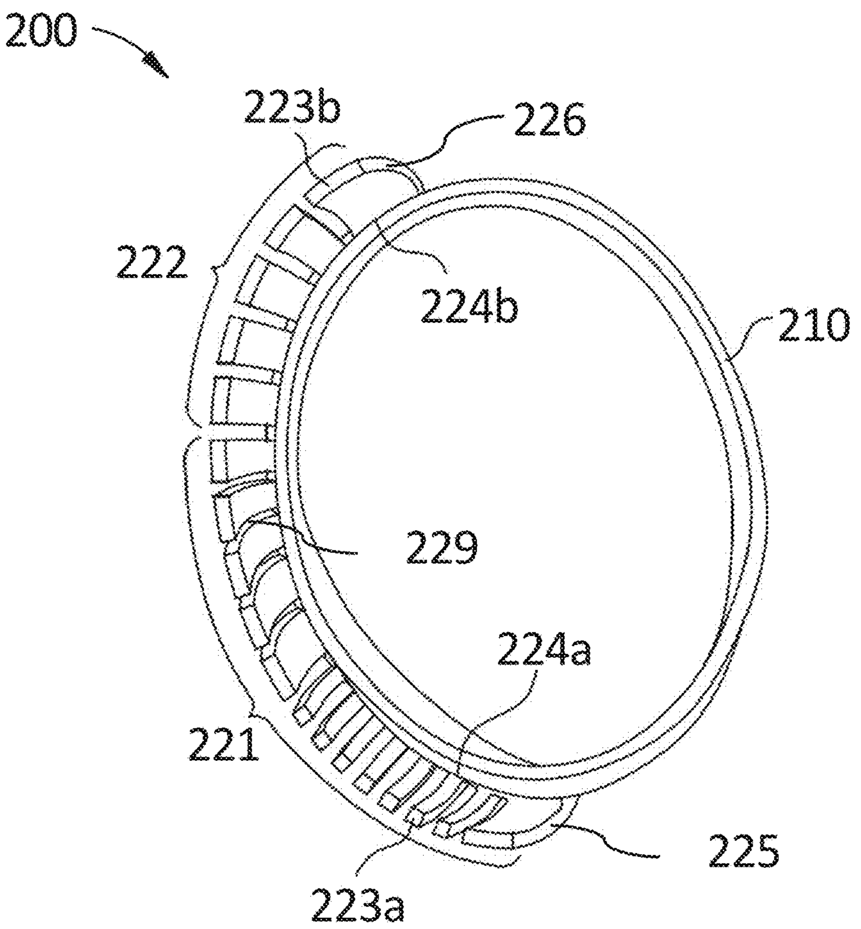
FIG. 6A is a rear view of the second embodiment of the retaining piece, according to aspects of the present disclosure.

FIGS. 4A to 4C, 6A and 6B show a second embodiment of the retaining piece 200. It should be noted that the features described for the first embodiment of the retaining piece 200 throughout the present disclosure may also apply, mutatis mutandis, for the second embodiment of the retaining piece 200. The cantilevered portion 220 of the retaining piece 200 according to the second embodiment also comprises the convexly curved section as defined above. The retaining piece 200 according to the second embodiment also comprises the trough shape. However, in the second embodiment of the retaining piece 200, the cantilevered portion 220 is coupled to the retainer portion 210 at the coupling edge 224. However, the first side edge 225 and the second side edge 226 are fully (or at least partially) distanced from the retainer portion 210. In the embodiments shown in FIGS. 4A to 4C, 6A and 6B, the first side edge 210 and the second side edge 226 are completely distanced from the retainer portion 210. In other words, the cantilevered portion 220 is not coupled to the retainer portion 210 at its first side edge 225 and second side edge 226. In this case, the first and second side edges 225, 226 may not be line-shaped, but define a surface area (as best shown in FIG. 6A), which may be substantially oriented in the circumferential direction u, respectively. However, it is also possible that the coupling edge 224 is curved towards the free edge 223 (or vice versa), wherein first and second side edges 225, 226 may be integral with the coupling edge 224 and/or the free edge 223. The opening of the trough shape may thus be substantially oriented towards the second end 212 and in the circumferential direction u. The opening may only be surrounded by the cantilevered portion 220 being opposite the part of the outer circumferential surface 214 over which the cantilevered portion 220 extends. However, the cantilevered portion 220 may be open in the circumferential direction u at first side edge 225 and second side edge 226. In other words, the cantilevered portion 220 may define an open "scoop" or "flap" structure together with the outer circumferential surface 214 of the retainer portion 210.

In other embodiments (not shown in the Figs.), the cantilevered portion 220 is coupled to the retainer portion 210 at the coupling edge 224, at the first side edge 225 or at the second side edge 226. The respective other first side edge 225 or second side edge 226 may be at least partially distanced from the retainer portion 210. In this case, the trough shape is only partially closed at (or between) the first side edge 225 or the second side edge 226. The trough shape may be closed at the first side edge 225 and may be open at the second side edge 226, or vice versa. This may be a combination of the first embodiment and the second embodiment of the retaining piece 200.

Referring back to FIGS. 3D to 3G, the cantilevered portion 220 comprises an outer contour 240 in a plane r1-r2 defined by first radial direction r1 and second radial direction r2, wherein an outer contour radius Rcon measured between the outer contour 240 of the cantilevered portion 220 and central axis x may be between 8.0 mm and 14.0 mm, more specifically between 9.5 mm and 13.5 mm. In some examples, the outer contour 240 may extend circumferentially about the cantilevered portion 220 between first side edge 225 and second side edge 226. The first radial axis r1 may extend in a direction from the central axis x, wherein the cantilevered portion 220 comprises a maximum contour radius Rmax, measured between the outer contour 240 of the cantilevered portion 220 and central axis x. In other words, the maximum contour radius Rmax may be at an "upper part", optionally at a second cantilevered sub-portion 222 (which will be described in detail below) of the cantilevered portion 220, which is adjacent the second side edge 226. A ratio between outer wall portion radius Ro of the retainer portion 210 and outer contour radius Rcon may be between 0.6 and 1.0, more specifically between 0.7 and 1.0. The value 1.0 may only occur at the first side edge 225 and/or the second side edge 226 of the cantilevered portion 220, when the cantilevered portion 220 is coupled to the retainer portion 210 on its coupling edge 224, first side edge 225 and/or second side edge 226. In other words, the outer contour radius Rcon may be substantially equal to the outer wall portion radius Ro at the first side edge 225 and/or the second side edge 226 of the cantilevered portion 220, when the cantilevered portion 220 is coupled to the retainer portion 210 on its coupling edge 224, first side edge 225 and/or second side edge 226.

In the disengaged state as shown in FIG. 3E, measured in the radial direction r between the outer contour 240 and the outer circumferential surface 214 of the retainer portion 210, the cantilevered portion 220 extends beyond the outer circumferential surface 214 of the retainer portion 210 by a first difference radius ΔR1, wherein the first difference radius ΔR1 may be between 0.0 mm and 6.0 mm. The first difference radius ΔR1 may be 0 mm at the first side edge 225 and/or at the second side 226 when these edges 225, 226 are coupled to the retainer portion 210. Optionally, the first difference radius ΔR1 may be defined by the averaged values of between 0.5 mm to 5.5 mm, more specifically between 1.0 mm and 5.0 mm, in particular between 1.3 mm and 4.9 mm. The first difference radius ΔR1 may vary for different radial positions (in the plane r1-r2) of the cantilevered portion 220 in the circumferential direction u between first side edge 225 and second side edge 226 and along length 11. In an embodiment, the first difference radius ΔR1 may be larger at a position close to the second side edge 226 (an upper portion of the cantilevered portion 220) than at a position close to the first side edge 225 (a lower portion of the cantilevered portion 220). Following the outer contour of the cantilevered portion 220 from the first side edge 225 towards the second side edge 226 in the circumferential direction u, the first difference radius ΔR1 may increase, optionally gradually increase, to a maximum difference radius, and may then decrease when moving further towards the second side edge 226. In the engaged state, as shown in FIG. 3F, measured in the radial direction r between the outer contour 240 and the outer circumferential surface 214 of the retainer portion 210, the cantilevered portion 220 extends beyond the outer circumference of the retainer portion 210 by a second difference radius ΔR2, wherein the second difference radius ΔR2 is equal to or smaller than the first difference radius ΔR1. The second difference radius ΔR2 may only be smaller than the first difference radius ΔR1 for respective parts of the cantilevered portion 220 that are deflected (i.e., on which the force F is applied). For those parts of the cantilevered portion 220 that are not deflected, the second difference radius ΔR2 may be substantially equal to the first difference radius ΔR1. A ratio of the second difference radius ΔR2 and the first difference radius ΔR1 may be between 0.7 and 1.0.

The retaining piece 200 can comprise (e.g., be made of) a first polymeric material. The first polymeric material may comprise a Shore A durometer of between 20 and 80, more specifically between 30 and 70, in particular between 40 and 60. In an example, the first polymeric material may comprise a Shore A durometer of between 45 and 55. The retainer portion 210 and/or the cantilevered portion 220 may comprise (or be made of) the first polymeric material. The first polymeric material as defined above may lead to increased comfort when the retaining piece 200 and/or the earpiece 10 is engaged with a user's concha 330 (e.g., the outer wall of the concha 300) over a longer period of time. Additionally, the first polymeric material may also provide sufficient stability of the retaining piece 200. The first polymeric material may be a thermoplastic, a thermosetting and/or an elastomeric polymer. In some examples, the first polymeric material may be a thermoplastic elastomer (TPE) or a fluoroelastomer. In embodiments, the first polymeric material may be a silicone. In other embodiments, the first polymeric material may be a rubber. Particularly, the first polymeric material may be from the group of silicone, polyurethane or polynorbornene. The first polymeric material may be a biocompatible material. The characteristic "biocompatible" may thereby be defined as the ability to be in contact with a living system without producing an adverse effect. In some examples, the retainer portion 210 may comprise a higher durometer (polymeric) material and the cantilevered portion 220 may comprise a lower durometer (polymeric) material. The materials may have the characteristics as defined for the first polymeric material. Thus, the retainer portion 210 having the higher durometer material may lead to increased stability and/or stiffness of the retaining piece 220 when coupling the retaining piece 200 to the earpiece 10, and the cantilevered portion 210 having the lower durometer material may lead to increased comfort when the retaining piece 220 is engaged with a user's concha 330 over a longer period of time. In embodiments, the cantilevered portion 220 and the retainer portion 210 may be integrally formed.

Figure 6B:
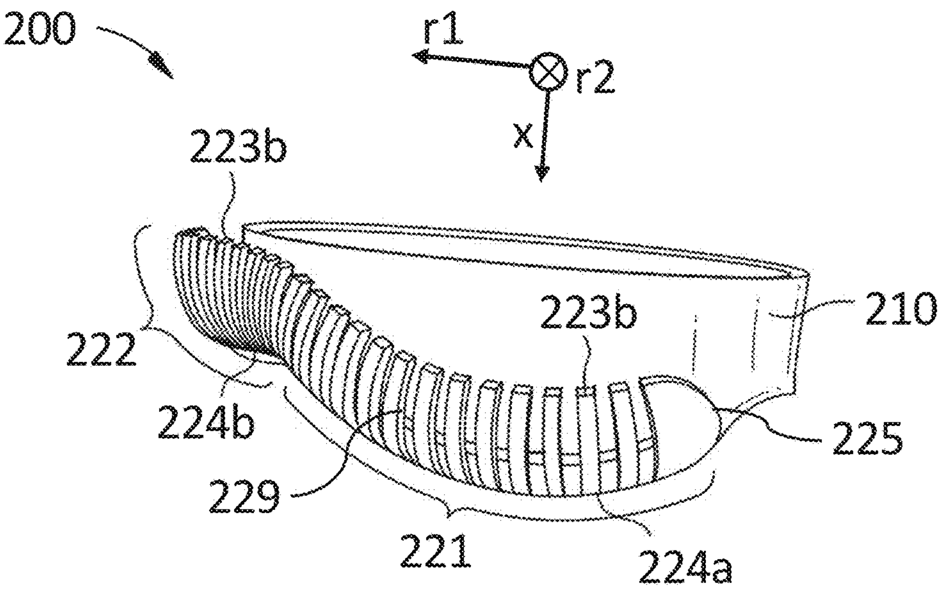
FIG. 6B is a perspective side view of the second embodiment of the retaining piece, according to aspects of the present disclosure.

Referring e.g., to FIGS. 3C, 6A and 6B, the cantilevered portion 220 comprises a first cantilevered sub-portion 221 and a second cantilevered sub-portion 222, wherein the first cantilevered sub-portion 221 may be configured to at least partially engage with the antitragus 310, and wherein the second cantilevered sub-portion 222 may be configured to at least partially engage with the antihelix 320 of the user's pinna 300. In other words, when the retaining piece 200 is in the engaged state, the first cantilevered sub-portion 221 at least partially contacts the antitragus 310, and the second cantilevered sub-portion at least partially contacts the antihelix 320 of the user's pinna 300. In embodiments, the first cantilevered sub-portion 221 and the second cantilevered sub-portion 222 may be integrally formed.

Figure 5A:
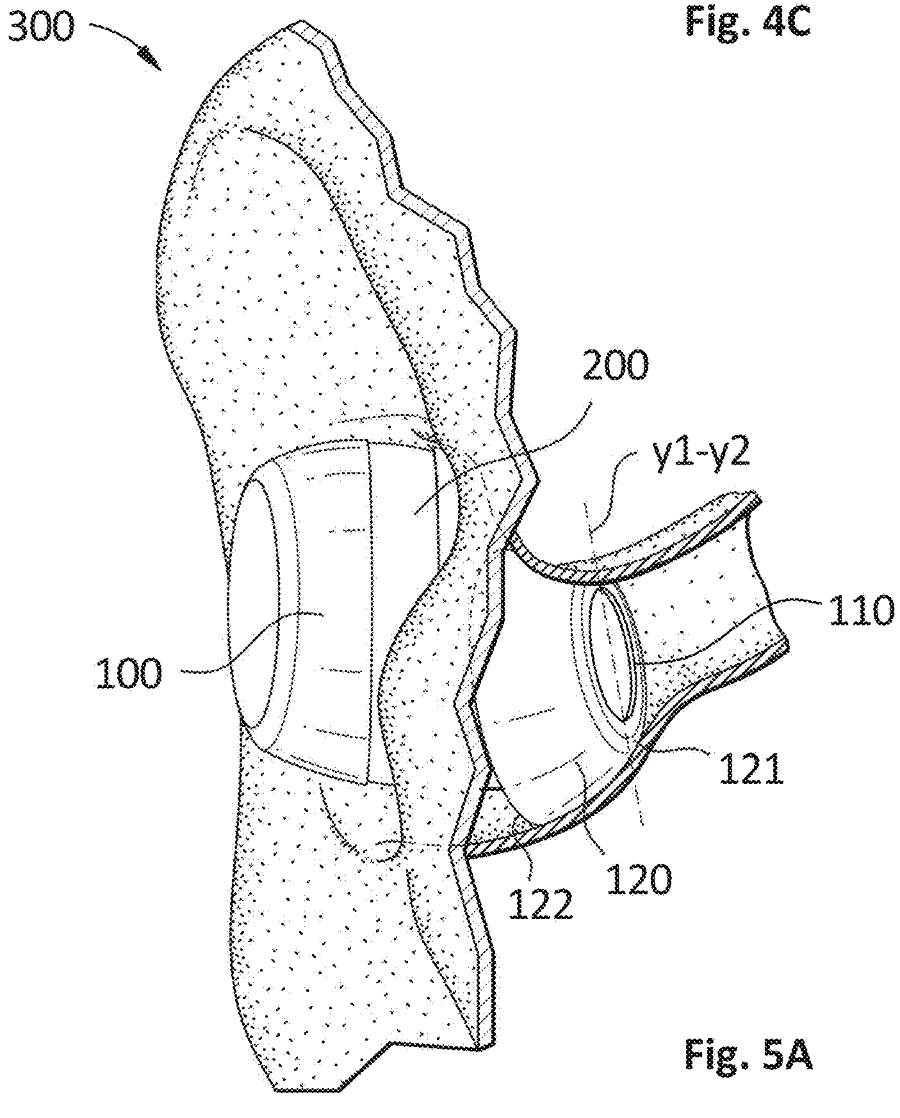
FIG. 5A is a side perspective view of the earpiece engaged with a user's pinna, according to aspects of the present disclosure.
Figure 5B:
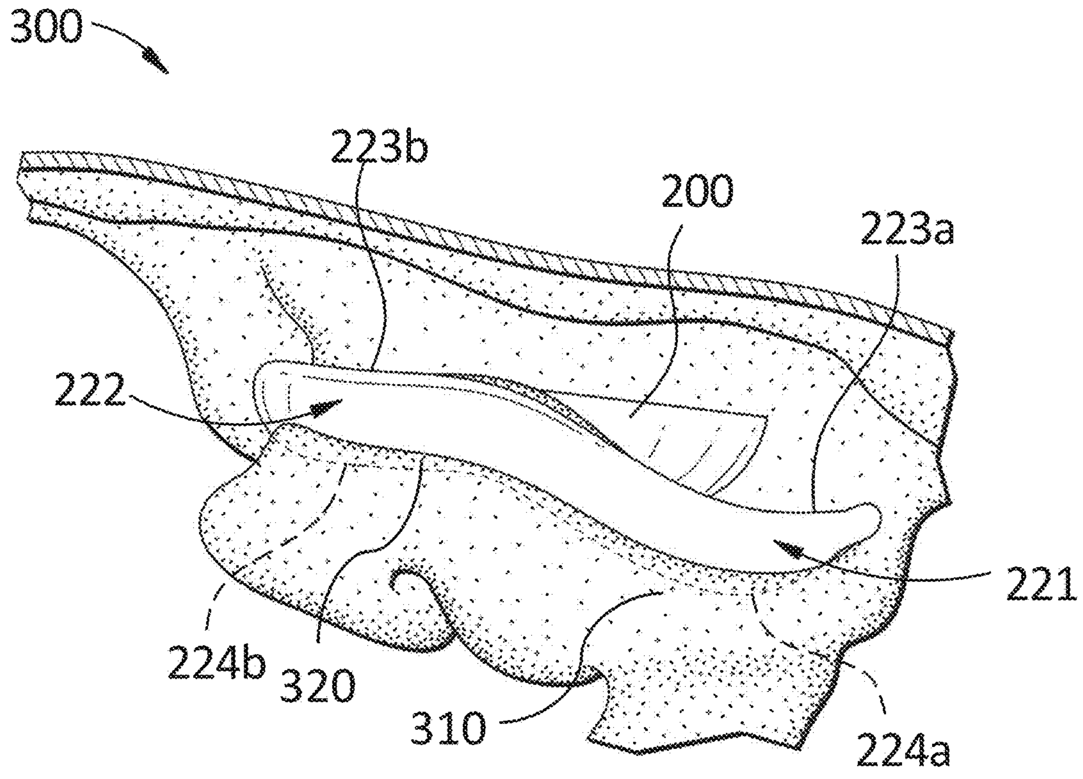
FIG. 5B is a side perspective view of the retaining piece engaged with a user's pinna, according to aspects of the present disclosure.
Figure 5C:
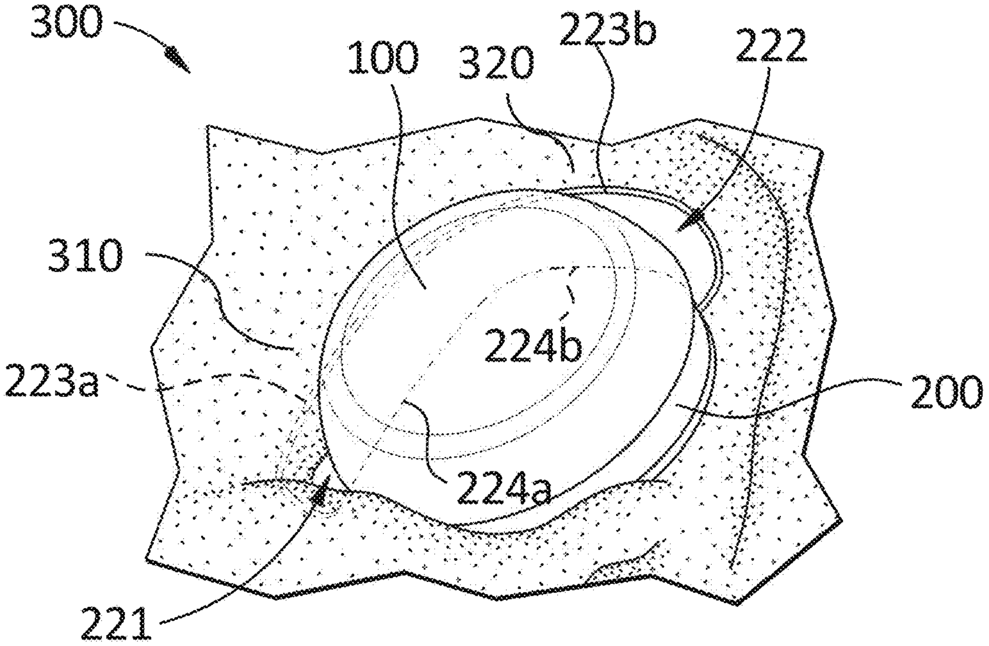
FIG. 5C is a top perspective view of the earpiece positioned in the user's ear, according to aspects of the present disclosure.

FIGS. 5B and 5C show a side perspective view and a top perspective view of the retaining piece 200 being engaged with a user's concha 330. As shown in FIG. 5B, due to typical ear geometries, antitragus 310 and antihelix 320 may extend on different planes. In order to engage with the user's pinna 300, optionally with antitragus 310 and/or antihelix 320, the first cantilevered sub-portion 221 and the second cantilevered sub-portion 222 may also extend primarily on different planes. In other words, when the cantilevered portion 220 is engaged, the first cantilevered sub-portion 221 may be more medial than the second cantilevered sub-portion 222 in the direction of the central axis x (i.e., the first cantilevered sub-portion 221 is closer to the ear canal 390 and/or the user's head and/or the concha floor than the second cantilevered sub-portion 222). In embodiments, the first cantilevered sub-portion 221 may at least partially engage with a groove or furrow provided by the antitragus 310 (between antitragus ridge and concha floor), and the second cantilevered sub-portion 222 may at least partially engage with a groove or furrow provided by the antihelix 320 (between antihelix ridge and concha floor).

As shown in FIG. 3C, the coupling edge 224 comprises a first coupling edge 224*a* associated with the first cantilevered sub-portion 221. The first coupling edge 224*a* extends, in the direction of the central axis x, to a first plane p1, and/or extends, in the circumferential direction u, primarily on the first plane p1. The first plane p1 may extend parallel to a plane r1-r2 defined by first radial direction r1 and second radial direction r2. The coupling edge 224 comprises a second coupling edge 224*b* associated with the second cantilevered sub-portion 222. The second coupling edge 224*b* extends, in the direction of the central axis x, to a second plane p2 and/or extends, in the circumferential direction u, primarily on the second plane p2. The second plane p2 may extend parallel to the plane r1-r2 defined by first radial direction r1 and second radial direction r2. The first plane p1 and the second plane p2 extend parallel to each other and the first plane p1 and the second plane p2 are distanced to each other by a first distance d1, wherein the first distance d1 is measured parallel to the central axis x. The first plane p1 may be arranged closer to the first end 211 in the direction of the central axis x than to the second end 212, and the second plane p2 may be arranged between first plane p1 and second end 212.

The free edge 223 comprises a first free edge 223*a* associated with the first cantilevered sub-portion 221. The first free edge 223*a* extends in the direction of the central axis x, to a third plane p3 and/or extends, in the circumferential direction u, primarily on the third plane p3. The third plane p3 may extend parallel to a plane r1-r2 defined by first radial direction r1 and second radial direction r2. Furthermore, the free edge 223 comprises a second free edge 223*b* associated with the second cantilevered sub-portion 222. The second free edge 223*b* extends, in the direction of the central axis x, to a fourth plane p4 and/or extends, in the circumferential direction u, primarily on the fourth plane p4. The fourth plane p4 may extend parallel to the plane r1-r2 defined by first radial direction r1 and second radial direction r2. In embodiments, the third plane p3 and the fourth plane p4 may be parallel to each other. The third plane p3 and the fourth plane p4 are distanced to each other by a second distance d2, wherein the second distance d2 is measured parallel to the central axis x. The third plane p3 may be arranged closer to the first end 211 than to the second end in the direction of the central axis x, and the fourth plane p4 may be arranged between third plane p3 and second end 212. In an embodiment, the first coupling edge 224*a* and/or the second coupling edge 224*b* may extend substantially parallel to the first free edge 223*a* and/or the second free edge 223*b*, respectively.

In FIG. 5B, a small portion of the first cantilevered sub-portion 221 proximate to the first free edge 223*a* and a small portion of the second cantilevered sub-portion 222 proximate to the second free edge 223*b* are visible from a top view when the earpiece is inserted in (or engaged with) the user's pinna 300. The antitragus 310 and/or antihelix 320 of the pinna 300 block view of the remainder of the first cantilevered sub-portion 221 and the second cantilevered sub-portion 222. However, they are both shown using dashed lines to illustrate a top view of the retaining piece 200 engaged with the user's pinna 300 at a deeper cross-section (viewed with respect to a user's concha floor or ear canal 390 in the direction of central axis x). At least a part of the first cantilevered sub-portion 221 that is proximate to the first coupling edge 224*a* contacts the user's antitragus 310 causing the first cantilevered sub-portion 221 to at least partially deflect towards the retainer portion 210 and/or to central axis x. At least a part of the second cantilevered sub-portion 222 that is proximate to the second coupling edge 224*b* contacts the user's antihelix 320 causing the second cantilevered sub-portion 222 to at least partially deflect towards the retainer portion 210 and/or to central axis x.

As shown in FIG. 3F, in embodiments, the cantilevered portion 220 may comprise a width w, measured between coupling edge 224 and free edge 223 parallel to the central axis x. The width w may be constant over a majority of length 11 of the cantilevered portion 220. In other embodiments, the width w may vary along the length 11 of the cantilevered portion 220. As shown in FIG. 3C, the first cantilevered sub-portion 221 comprises a first width w1 and the second cantilevered sub-portion 222 comprises a second width w2, measured parallel to the central axis x, respectively. In embodiments, the first width w1 may be larger than the second width w2. In some examples, the first width w1 is measured between the first plane p1 and the third plane p3, and/or, between first coupling edge 224*a* and first free edge 223*a*. The second width w2 is measured between the second plane p2 and the fourth plane p4, and/or between second coupling edge 224*a* and second free edge 223*a*. In embodiments, the first width w1 may be between 2.0 mm and 4.3 mm, more specifically between 2.1 mm and 4.2 mm, and the second width w2 may be between 0.9 mm and 3.3 mm, more specifically between 1.0 mm and 3.2 mm.

The cantilevered portion 220 comprises a transition region 230 extending between first cantilevered sub-portion 221 and second cantilevered sub-portion 222 in the circumferential direction u, wherein the transition region 230 may comprise a curved shape, optionally a wave-shape, in the circumferential direction u. The transition region 230 may be defined as the portion between first cantilevered sub-portion 221 and second cantilevered sub-portion 222, where the cantilevered portion 220 changes its shape from the first width w1 to the second width w2. In the embodiment shown in FIG. 3C, the first coupling edge 224*a* and the second coupling edge 224*b* together form a wave-shape in the transition region 230. In other words, the wave-shape may be defined by a concave shape and a convex shape. As an example, viewed from the second end 212 towards the first end 211, the first coupling edge 224*a* may have a convex shape and the second coupling edge 224*b* may have a concave shape in the transition region 230. Furthermore, the first free edge 223*a* and the second free edge 223*b* may together form a wave-shape in the transition region 230. As an example, viewed from the second end 212 towards the first end 211, the first free edge 223*a* may have a convex shape and second free edge 223*b* may have a concave shape.

As shown in FIGS. 6A and 6B, the cantilevered portion 220 may, at least partially along its length 11 in the circumferential direction u, comprise grooves 229 extending from the free edge 223 at least partially towards the coupling edge 224 in the radial direction r. The grooves may lower the stiffness of the material of the cantilevered portion 220, leading to increased comfort and/or flexibility when the retaining piece 220 is engaged with a user's pinna 300. In embodiments, the first cantilevered sub-portion 221 and/or the second cantilevered sub-portion 222 and/or the transition region 230 may comprise the grooves 229. In embodiments, the distances of the grooves 229 along the length 11 and in the circumferential direction u of the cantilevered portion 220 may vary. In other embodiments, the distances between the grooves 229 may be constant. Furthermore, the grooves 229 may have a width, measured in the circumferential direction u, which may be constant, or, which may vary along the length 11 of the cantilevered portion 220. The number or width of grooves 229 may be increased and/or the spacing between adjacent grooves 229 may be decreased in regions of the outer wall of the pinna 300 where there is a rapid change (e.g., curvature) in ear geometry or a greater variation from person to person (e.g., the curvature of antihelix 320 and/or antitragus 310 may vary from person to person). The grooves 229 may provide increased flexibility for a single retaining piece 200 to follow the outer wall of the concha 330 of the pinna 300 and fit on most pinnae 300 having different geometries.

As best shown in FIGS. 3D and 3E, the cantilevered portion 220 comprises a thickness t, measured in a cross-section between inner cantilevered portion surface 227 and outer cantilevered portion surface 228. In embodiments, the thickness t may be between 0.4 mm and 0.8 mm, more specifically between 0.45 mm and 0.75 mm. The thickness t is substantially constant along the entire length 11 of the cantilevered portion 220, and/or the thickness t is substantially constant between free edge 223 and coupling edge 224. However, in other embodiments, the thickness t may vary along the length 11 of the cantilevered portion 220 and/or between free edge 223 and coupling edge 224. For example, the first cantilevered sub-portion 221 may comprise a first thickness and the second cantilevered sub-portion 222 may comprise a second thickness. The first thickness may be larger or smaller than the second thickness. The first thickness may change to the second thickness in the transition region 230. The thickness may be measured at any position between free edge 223 and coupling edge 223 and/or between first side edge 225 and second side edge 226, in a cross-section of the cantilevered portion 220 between inner cantilevered portion surface 227 and outer cantilevered portion surface 228. In embodiments, the thickness t may increase when moving from the free edge 223 towards the coupling edge 224. In the example shown in FIG. 3E, the cantilevered portion 220 may have a maximum thickness tmax proximate the coupling edge 224 and/or along the length 12 of the coupling edge 224, and a minimum thickness tmin proximate the free edge 223 and/or along the length 11 of the free edge 223.

According to a second aspect of the present disclosure, a kit of parts (not shown in the Figs.) comprises a retaining piece holder comprising a plurality of retaining pieces 200 according to the embodiments as described above. Each of the plurality of retaining pieces 200 may comprise a retainer portion 210 having the same geometric dimension. Additionally or alternatively, at least some retaining pieces 200 of the plurality of retaining pieces 200 comprise cantilevered portions 220 that have different geometric dimensions that are adapted to different sizes of users' pinnae 300. As the size of user's pinnae 300 is different from individual to individual and especially for children and adults, it is desirable to provide three different sizes of cantilevered portions 220, optionally small, medium and large (additionally, the ability of the cantilevered portion 220 to deflect may increase the bandwidth of engagements with different sizes of pinnae 300). In other words, each retaining piece 200 of the plurality of retaining pieces 200 may comprise a retainer portion 210 that has a plurality of standard geometric parameters defining a geometric dimension of the retainer portion 210. A standard geometric parameter may be for example, but not limited to, the inner wall portion radius Ri and the outer wall portion radius Ro. At least one retaining piece 200 of the plurality of retaining pieces 200 may comprise a cantilevered portion 220, that is larger or smaller than the cantilevered portions 220 of the respective other retaining pieces 200. In some examples, geometric parameters like (but not limited to) Rcon, thickness t, w1, or w2 which define the geometric dimension of the cantilevered portion 220 of the at least one retaining piece 200 may be larger or smaller than the geometric parameters of the respective other retaining pieces 200.

According to a third aspect of the present disclosure, the earpiece 10 of an in-ear audio device comprises a housing 100 and a retaining piece 200 as described above. FIGS. 2A to 2D show different views of a first embodiment of the in-ear earpiece 10 and FIGS. 4A to 4C show different views of a second embodiment of the in-ear earpiece 10. The retaining piece 200 can be releasably coupled to the housing 100, optionally by means of the retainer portion 210. This may lead to the advantage that the retaining piece 200 is interchangeable and different sizes of the retaining piece 200 (e.g., having different geometric sizes of the cantilevered portion 220) can be coupled to the housing 100. However, in other embodiments, the retaining piece 200 may be permanently coupled to the housing 100. In some examples, the retaining piece 200 is coupled to an outer circumference of the housing 100. When coupled, the retaining piece 200 may extend at least partially about the outer circumference of the housing 100. In the embodiments shown in FIGS. 2A to 2D and 4A to 4C, the retainer portion 210 is formed as a sleeve that fits around the outer circumference of the housing 100 (particularly, of the intermediate housing portion as defined below). The retainer portion 210, optionally the tubular wall portion 213, comprises an inner wall surface that may at least partially conform to an outer circumferential surface of the housing 100. In an embodiment, the retainer portion 210 may comprise a gap formed in the tubular wall portion 213 and which extends substantially parallel to the central axis x between first end 211 and second end 212. Thus, the retainer portion 210 may be adapted as a clip and configured to be clipped on the housing 100 (or otherwise coupled to the housing 100, removably or permanently). In other words, the tubular wall portion 213 may extend partially over the total circumference of the housing 100. However, in other embodiments, the retainer portion 210 may be integrally formed with the housing 100 and the cantilevered portion 220 may be coupled to the retainer portion 210 via the coupling edge 224. In an embodiment, the cantilevered portion 220 may be directly coupled to the housing 100—in this case, the retaining piece 200 may not comprise a retainer portion 210.

Figure 2B:
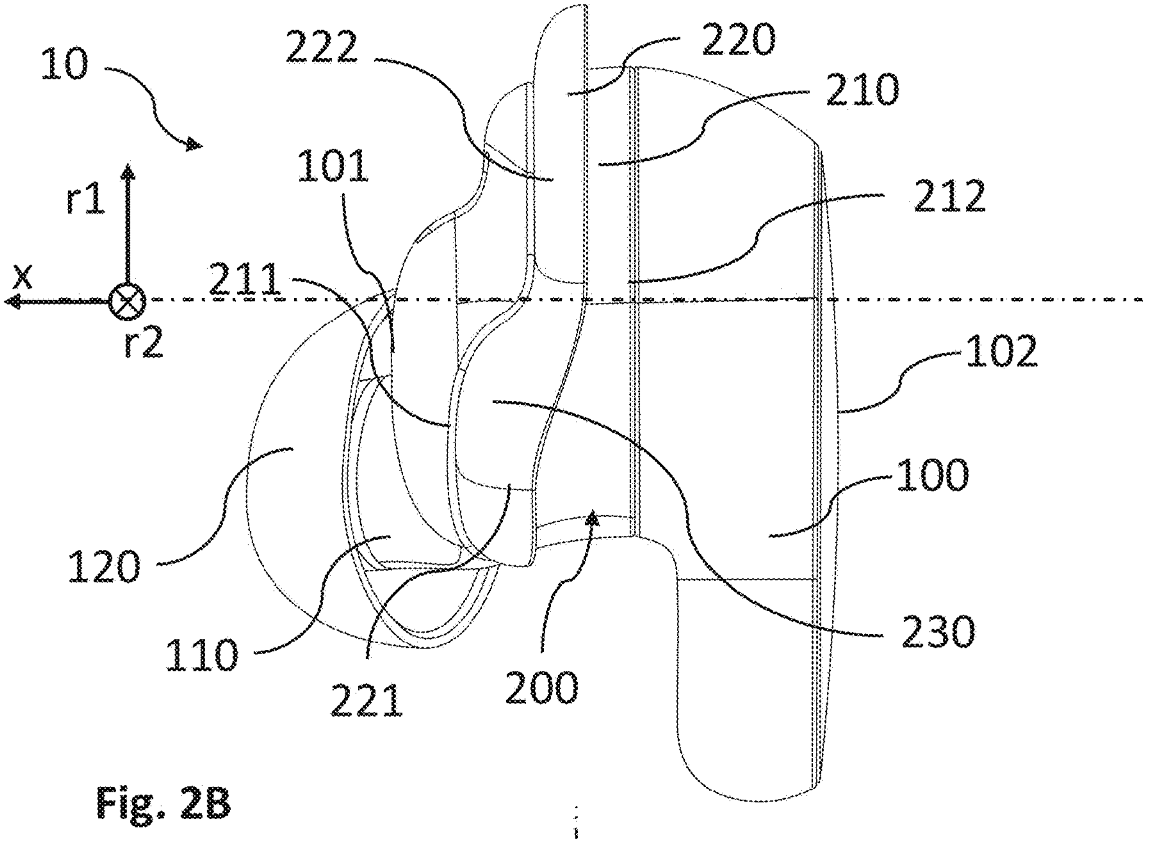
FIGS. 2B, 2C and 2D are a side view, a rear view and a front view of the earpiece shown in FIG. 2A.
Figure 2C:
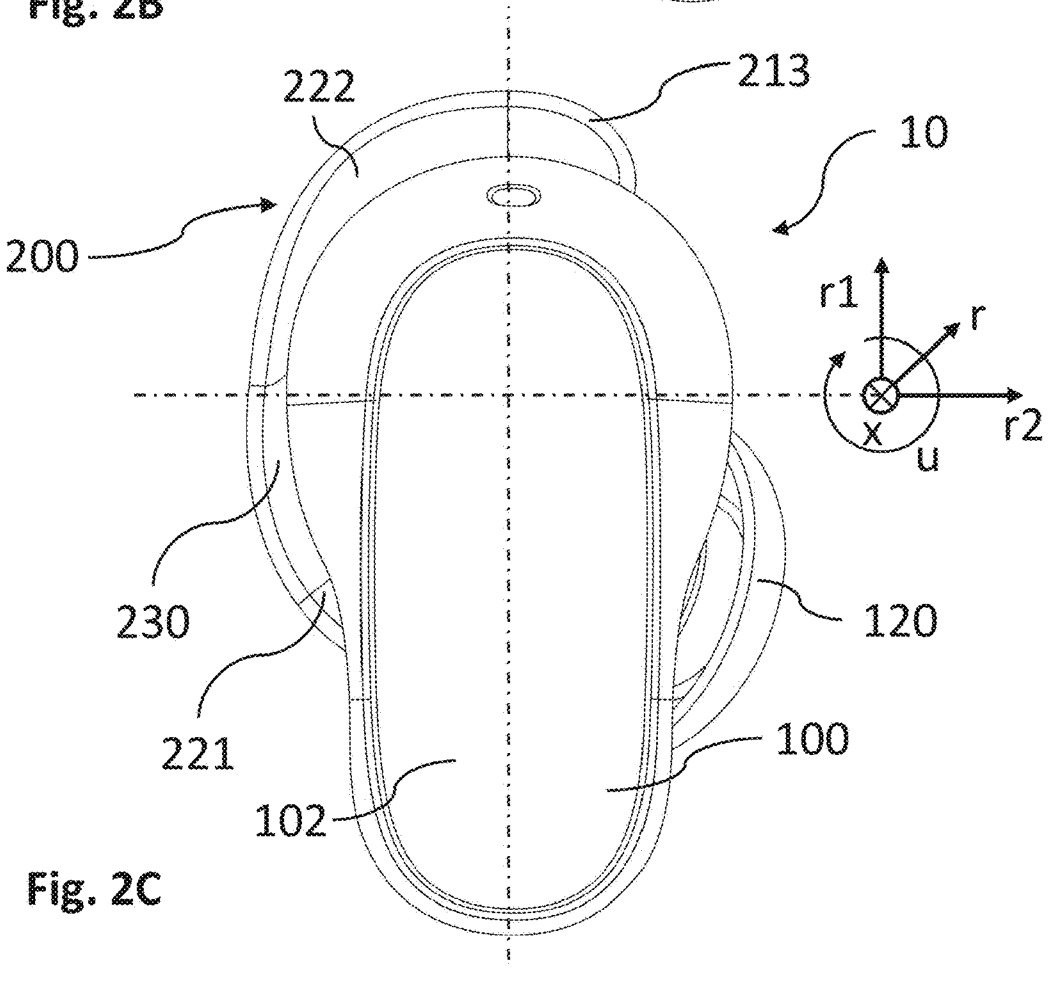
Figure 2D:
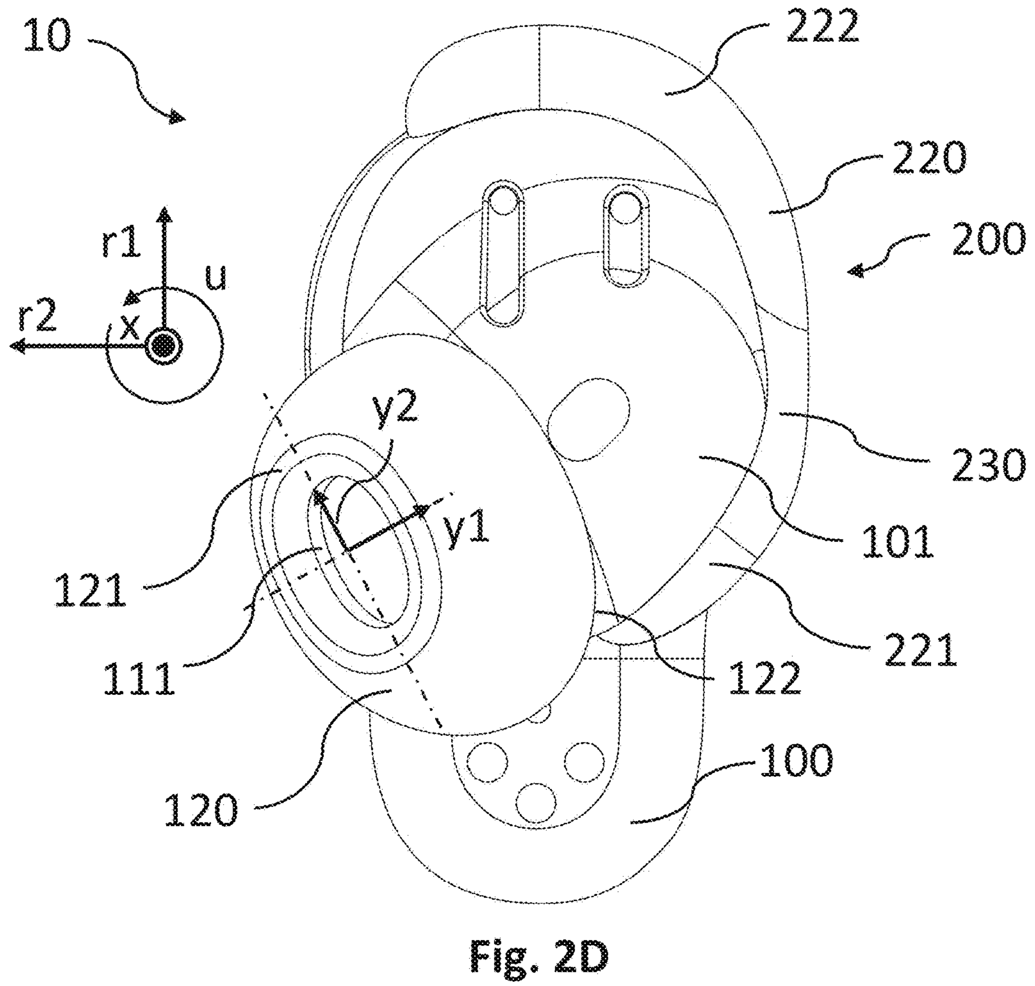

As best shown in FIGS. 2A and 2B, the housing 100 comprises a front side 101 and a back side 102 substantially opposite the front side 101. When the housing 100 is engaged with at least a part of a user's ear, the front side 101 is more medial than the back side 102. In other words, when engaged, the front side 101 may be closer to the user's ear canal 390 and/or head and/or concha floor than the back side 102 (i.e., the back side 102 may be distal to the user's ear canal 390 as compared to the front side 101). The coupling edge 224 and/or the first end 211 of the retaining piece 200 is arranged closer to the front side 101 than to the back side 102 in the direction of the central axis x, and the free edge 223 and/or the second end 212 of the retaining piece 200 is between the coupling edge 224 and/or the first end 211 and the back side 102. In other words, when the earpiece 10 is engaged with a user's ear, the front side 101 is more medial than the first side 211, and the second side 212 is more medial than the back side 102. A bottom of the trough shape is closer to the front side 101 than to the back side 102 and an opening of the trough shape is between the bottom of the trough shape and the back side 102. In embodiments, the housing 100 may be made of a hard polymeric material, optionally from the group of Acrylonitrile Butadiene Styrene (ABS), Polycarbonate/Acrylonitrile Butadiene Styrene (PCB/ABS), polyetherimide (PEI), or stereolithography (SLA) resin. The hard polymeric material may be a biocompatible material. In some examples, the hard polymeric material may be a thermoplastic, a thermoset or an elastomer.

In an embodiment, the earpiece 10 has an earpiece length measured between the front side 101 and the back side 102 parallel to the central axis x. The second end 212 may be located in a range of 30% to 70%, more specifically in a range of 40% to 60%, of the earpiece length viewed from the front side 101 towards the back side 102 (i.e. about halfway through the earpiece length).

The housing 100 comprises a front housing portion at the front side 101, a back housing portion at the back side 102 and an intermediate housing portion connecting the front housing portion and the back housing portion. The housing portions may be integrally formed. Each of the housing portions may have a substantially oval cross-section. In the first embodiment shown in FIGS. 2A to 2D, measured in the first radial direction r1, the back housing portion may have a diameter that is larger than a diameter of the intermediate housing portion, and the intermediate housing portion may have a diameter that is larger than a diameter of the front housing portion. In other words, a cross-section of the back housing portion, measured in the plane r1-r2 defined by first radial axis r1 and second radial axis r2, may be larger than a cross-section of the intermediate housing portion, and a cross-section of the intermediate housing portion may be larger than a cross-section of the front housing portion. However, in the second embodiment shown in FIGS. 4A to 4C, the cross-section of the back housing portion and/or the cross-section of the front housing portion may be substantially equal to, or smaller than the cross-section of the intermediate housing portion. The back housing portion as shown e.g., in FIG. 2A, has an oval cross-section in the radial plane r1-r2 with a maximum diameter that extends substantially in the first radial direction r1. As shown in the FIGS. 2A to 2D, when coupled, the orientation of the retaining piece 200 with respect to the housing 100 may be such that the maximum contour radius Rmax is at an upper portion of the housing 100, with respect to the first radial direction r1. In embodiments, radius Rmax may extend in a radial direction r that is substantially parallel to the direction of the maximum diameter of the back housing portion.

The retaining piece 200 may be coupled to the intermediate housing portion. In embodiments, the intermediate housing portion may comprise a locking feature that is configured to engage with a mating locking feature provided on the retaining piece 200. As an example, the retaining piece 200 may comprise a recess provided on the tubular wall portion 213 and the intermediate housing portion may comprise a protrusion configured to engage with the recess, or vice versa. Additionally or alternatively, the intermediate housing portion may comprise a groove extending about at least a part of the outer circumference of the intermediate housing portion. When coupled, the retaining piece 200 may be at least partially inserted in the groove. The locking feature may prevent or at least reduce unwanted movement in the direction of the central x and/or in the circumferential direction u relative to the housing 100. Furthermore, the locking feature may ensure a specific orientation of the cantilevered portion 220 of the retaining piece 200 with respect to the housing 100 and/or the nozzle 110 as described below. In other embodiments, the locking feature may also be provided in a way that, when coupled, the retaining piece 200 firmly encloses the outer circumference of the housing 100 and thus prevents or at least reduces unwanted movement in the direction of the central x and/or in the circumferential direction u relative to the housing 100 due to increased frictional force between the inner wall surface of the tubular wall portion 213 and outer circumferential surface of the housing 100.

Referring to FIGS. 2A to 2D and 4A to 5A, the housing 100 comprises a nozzle 110 extending from the front side 102 of the housing 100 obliquely in a direction defined by the central axis x and by radial direction r. Thus, when the earpiece 10 is engaged with a user's ear, the nozzle 110 may extend towards a user's ear canal 390. In other words, the nozzle 110 may extend from the housing 100 in an oblique direction, which is a combination of the direction of central axis x and a radial direction r.

The housing 100 may comprise a cavity in which an electro-acoustic transducer, a battery and/or an electronic circuitry may be disposed. The transducer may be arranged in the housing 100 such that a majority of the transducer is located in or surrounded by the outer wall of the concha 330 of the user's pinna 300 when the earpiece 10 is in the engaged state. The electro-acoustic transducer may be defined as a device that is adapted to convert electricity (e.g., electrical current, voltage variations) into acoustic energy (e.g., sound vibrations, oscillation in air pressure), or vice versa. In embodiments, the electro-acoustic transducer may be a speaker (or a sound emitting component), a receiver or a driver. The electronic circuitry may comprise a wireless transmitter (e.g., to receive and/or transmit audio and/or control signals wirelessly). The housing 100 may comprise one or more control elements (e.g., push-buttons or capacitive buttons) to control functions of the earpiece 10 and/or the in-ear audio device (e.g., switching the device on or off, changing a volume of the audio). The housing 100 can include one or more sensors (e.g., a microphone or a sensor for sensing a bodily function). The housing 100 can include one or more indicator elements (e.g., light emitting elements).

The cavity may be acoustically coupled to an acoustic passage in the nozzle 110, such that the electro-acoustic transducer can be acoustically coupled to a user's ear when the earpiece 10 is worn. The housing 100 may also support one or more microphones. In some examples, when the earpiece 10 is worn, the nozzle 110 may be configured to guide acoustic energy from the housing 100, optionally from the electro-acoustic transducer, towards the user's ear canal 390. The length of the nozzle 110 may be varied in order to adapt the length of the nozzle 110 to the anatomy of a user's ear. In other embodiments, an angle of the nozzle 110 extending obliquely from the housing 100 may be varied with respect to the housing 100.

As best shown in FIGS. 2A to 2D and 4A to 4C, the nozzle 110 comprises a planar, distal end 111 and an acoustic passage configured to conduct acoustic energy (i.e., sound waves). In embodiments, the distal end 111 may comprise a substantially elliptical opening for the acoustic passage. In other embodiments, the distal end 111 may comprise an oval shape or a racetrack shape. Referring to FIGS. 1B, 2D, 4A, 4C and 5A, a plane y1-y2 defined at the distal end 111, particularly at the substantially elliptical opening, may be substantially parallel to a major axis (see, FIG. 1B) of the user's ear canal 390, when the earpiece 10 is engaged with a user's ear. The major axis may extend through (or be parallel to) a plane defined by a cross-section of the user's ear canal 390, particularly close to an entrance of the ear canal 390. The major axis may thereby be perpendicular to an outer wall of the ear canal 390 and/or to the centerline 391*a*, 391*b*.

As shown in FIGS. 2A to 2D and 4A to 4C, the earpiece 10 further comprises an ear tip 120 configured to engage with an ear canal 390 of a user's ear. In some examples, the ear tip 120 may be adapted to create an acoustic seal with a user's ear canal 390. FIG. 5A is a side perspective view of the earpiece 10 positioned in a user's ear. In embodiments, the ear tip 120 may be releasably coupled to the distal end 111 of the nozzle 110. The ear tip 120 may be substantially dome-shaped. The ear tip 120 comprises a narrow end 121, a wider end 122, and a substantially dome-shaped outer wall portion 123 extending between the narrow end 121 and the wider end 122. In other words, the outer wall portion 123 may have an oblong cross-sectional shape, e.g., the shape of an ellipse, an oval, or an oblong shape with rounded ends and curved splines connecting them. The outer wall portion 123 may be the portion of the ear tip 120 that contacts and conforms to the user's ear canal 390 to form an acoustic seal therebetween, when the earpiece 10 is engaged with the user's ear. The outer wall portion 123 may be designed to apply reduced pressure on the wearer's ear canal 390 and may decrease a force vector that pushes the earpiece 10 out of the wearer's ear canal 390. In other words, instead of a straight connection, the outer wall portion 123 is a slightly curved (i.e., dome-shape as described above) connection between the narrow end 121 and the wider end 122. Further an elliptical opening of the ear-tip provided on the narrow end 121 may align with typical ear geometry and may allow an earpiece 10 to comfortably accommodate varying ear canal 390 sizes.

The wider end 122 may comprise a diameter that is larger than a diameter of the ear canal 390 and/or the narrow end 121 may have a diameter that is smaller than a diameter of an entrance of the ear canal 390 (when earpiece 10 is in the disengaged state). However, the outer wall portion 123 may be configured to at least partially deflect in a radial direction towards the nozzle 100, when inserted at least partially into a user's ear canal 390. In embodiments, this may be the case when the ear tip 120 is engaged with the user's ear canal 390. The ear tip 120 may comprise an inner wall portion extending from the narrow end 121 at least partially towards the wider end 122. The inner wall portion may define and surround an extension of the acoustic passage. The outer wall portion 123 be connected to the inner wall portion at the narrow end 121, optionally wherein the wider end 122 may be spaced to the inner wall portion (i.e., not connected to the inner wall portion). The inner wall portion may comprise a tubular shape that is configured to couple the ear tip 120 to the nozzle 110. Thus, the inner wall portion may comprise a cross-section that is circular, elliptic or oval. In embodiments, the inner wall portion may comprise a retention member that is configured to engage a mating retention member on the nozzle 110. In an embodiment, the retention member may be a protrusion that extends around an inner surface of the inner wall portion. The mating retention member may be recess or a groove, that is defined by and extends around an outer circumferential surface of the nozzle 110. The engagement of the retention members may help to retain the ear tip 120 on the nozzle 110 and may provide an improved acoustic seal therebetween.

The ear tip 120 can comprise (e.g., be made of) a second polymeric material. The second polymeric material may comprise a Shore A durometer of between 10 and 80, more specifically between 15 and 75, in particular between 20 and 70. The inner wall portion and/or the outer wall portion 123 may comprise (or be made of) the second polymeric material. The second polymeric material as defined above may lead to increased comfort when the earpiece 10 is engaged with a user's ear (e.g., ear canal 390) over a longer period of time. Additionally, the second polymeric material may provide sufficient stability of ear tip 120, especially when coupled to the nozzle 110. The second polymeric material may be a thermoplastic, a thermosetting and/or an elastomeric polymer. In some examples, the second polymeric material may be a thermoplastic elastomer (TPE) or a fluoroelastomer. In embodiments, the second polymeric material may be a silicone. In other embodiments, the second polymeric material may be a rubber. Particularly, the second polymeric material may be from the group of silicone, polyurethane or polynorbornene. The second polymeric material may be a biocompatible material (see, definition above). In some examples, the inner wall portion may comprise a higher durometer (polymeric) material and the outer wall portion 123 may comprise a lower durometer (polymeric) material. The materials may have the characteristics as defined for the second polymeric material. Thus, the inner wall portion having the higher durometer material may lead to increased structural stability and/or stiffness of the ear tip 120, when the ear tip 120 is coupled to nozzle 110 (or when coupling the ear tip 120 to the nozzle). The outer wall portion 123 having the lower durometer material may lead to increased comfort when the ear tip 120 is engaged with a user's ear (e.g., ear canal 390) over a longer period of time. The outer wall portion 123 and the inner wall portion may be integrally formed.

Figure 7:
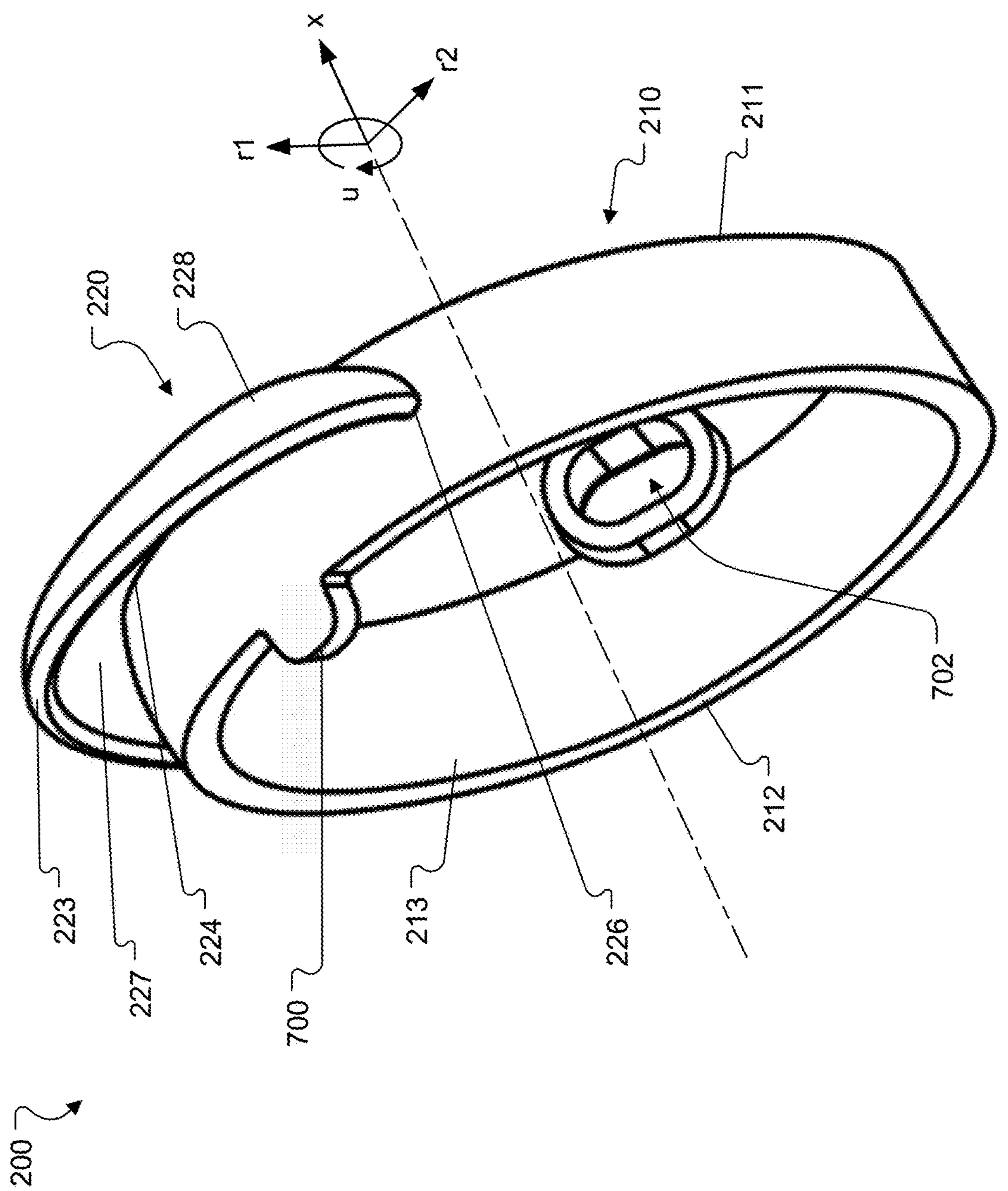
FIG. 7 is a perspective view of another embodiment of the retaining piece.

FIG. 7 shows an alternative implementation of the retaining piece 200 that has a locking feature which includes a first alignment feature that is arranged along the tubular wall portion 213 in direction substantially parallel to the central axis x. In the illustrated example, the first alignment feature in the in the form of an alignment key 700 that extends outwardly from the second end 212 of the retainer portion 210. The alignment key 700 may be formed integrally with the tubular wall portion 213. As shown in FIG. 7, the alignment key 700 may be arranged at a position along the circumferential direction (u) that is substantially aligned with the location of the maximum radius Rmax (FIG. 3D) of the retaining piece 200. In some implementations, the retaining piece 200 may also include an opening 702 which aligns with a port (not shown) on the housing 100 such as described in U.S. patent application Ser. No. 17/574,744, titled "IN-EAR AUDIO OUTPUT DEVICE HAVING A STABILITY BAND DESIGNED TO MINIMIZE ACOUSTIC PORT BLOCKAGE," filed on Jan. 13, 2022, the complete disclosure of which is incorporated herein by reference.

Figure 8:
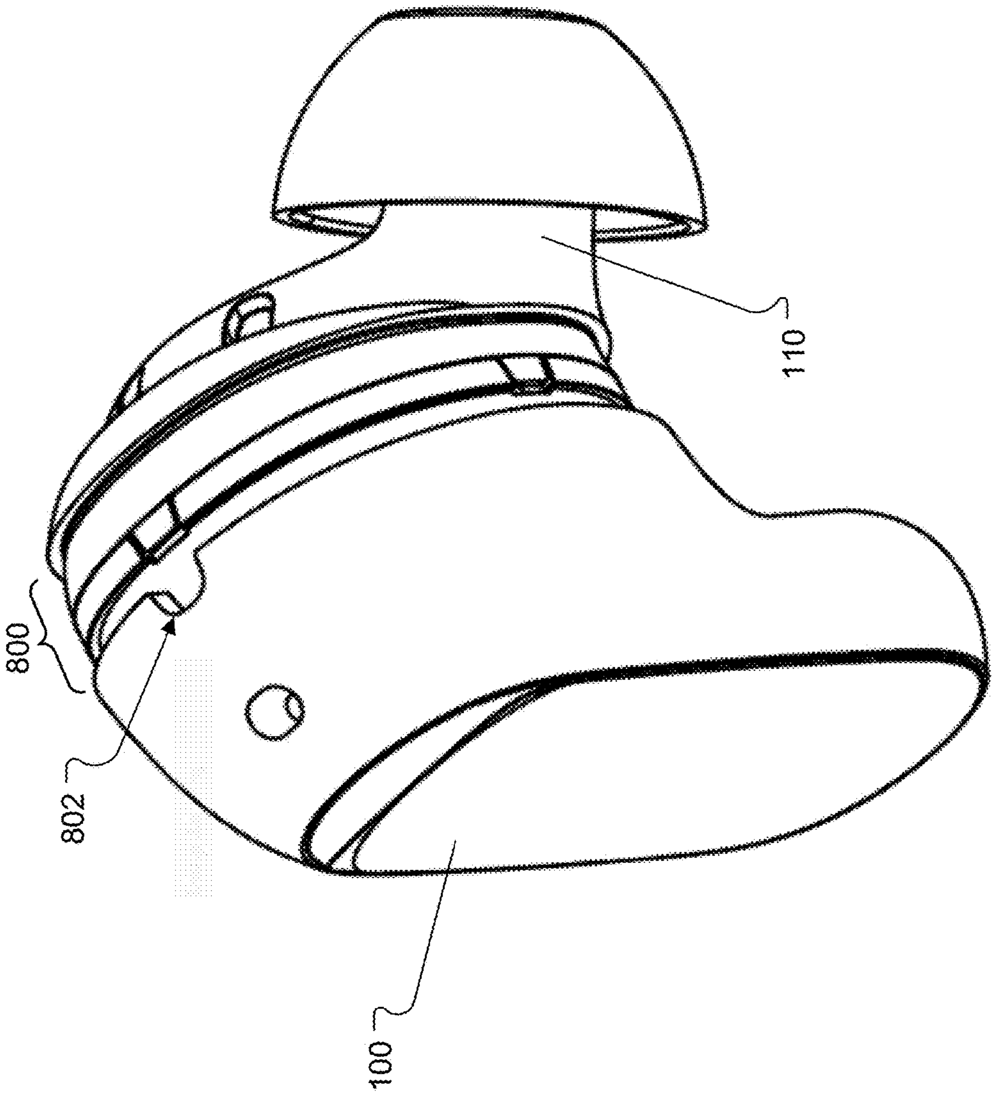
FIG. 8 is a perspective view of a housing configured to be coupled with the retaining piece of FIG. 7.

With reference to FIGS. 7 and 8, the housing 100 includes a mating locking feature that engages with the locking feature of the retaining piece 200 to inhibit (e.g., prevent) unwanted movement in the direction of the central x and/or in the circumferential direction u relative to the housing 100. As shown in FIG. 8, the mating locking feature includes a groove 800 that extending around the outer circumference of the intermediate housing portion and a second alignment feature in the form of an alignment notch 802.

Figure 9:
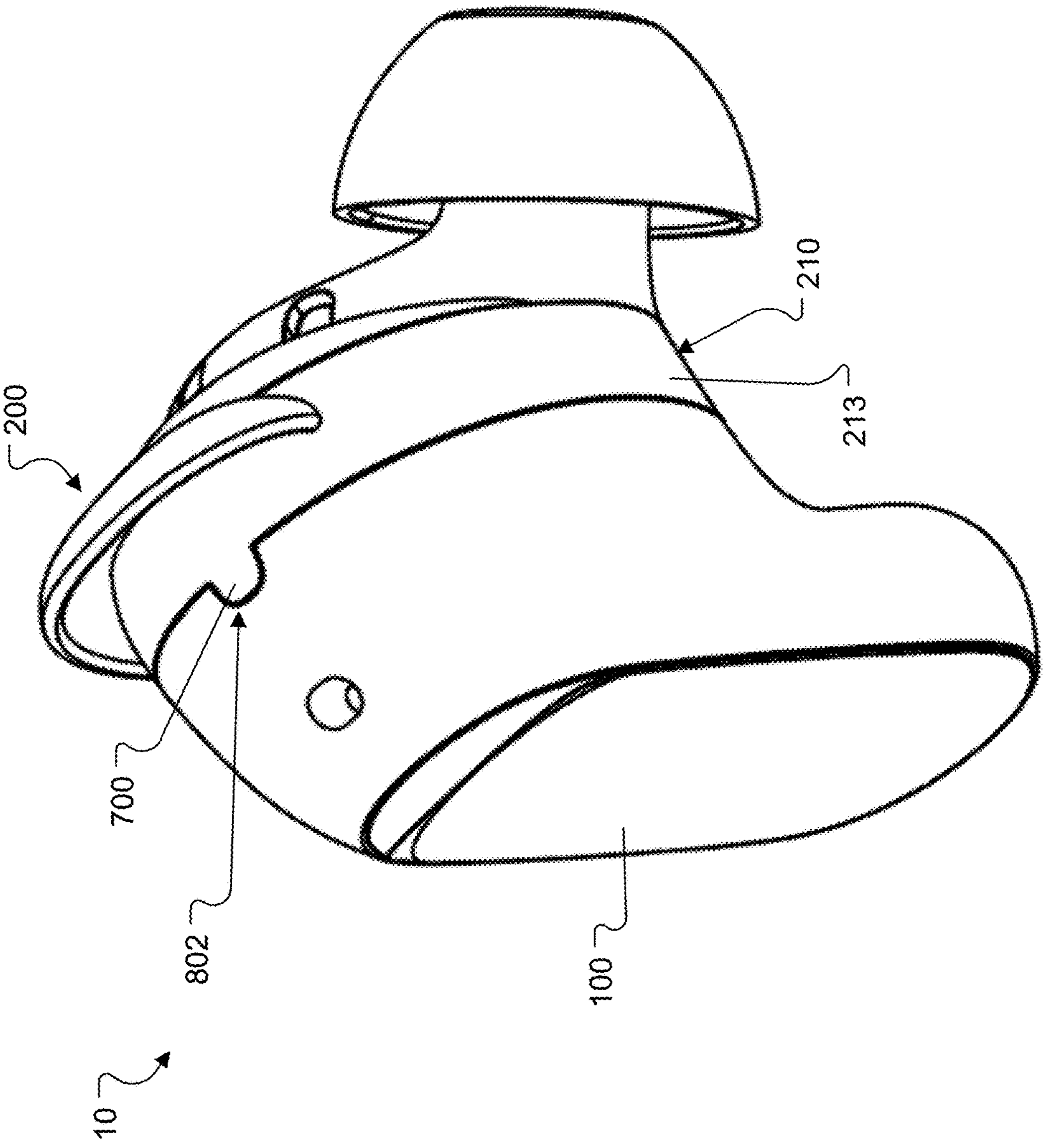
FIG. 9 is a perspective view of a third embodiment of an in-ear earpiece including the retaining piece of FIG. 7 and the housing of FIG. 8.

When coupled, the tubular wall portion 213 of the retainer portion 210 is at least partially inserted in the groove 800 (FIG. 8) and the alignment key 700 rests within the alignment notch 802, as shown in FIG. 9. The engagement of the alignment key 700 with the alignment notch 802 may provide both a visual and mechanical confirmation of proper alignment between the retaining piece 220 and the housing 100, and, thus, can help to ensure a specific orientation of the cantilevered portion 220 of the retaining piece 200 with respect to the housing 100 and/or the nozzle 110. In some cases, for example, the alignment key 700 and the alignment notch 802 may be positioned such that they are visible while the earpiece 10 is stored in a charging case, so that, when a user opens the charging case, he/she can clearly see whether the retaining piece 200 is properly aligned relative to the housing 100 to ensure that that the relative position of the retaining piece 200 did not shift during storage. The engagement of the alignment key 700 and the alignment notch 802 can also inhibit rotation of the retaining piece 200 (e.g., about the circumferential axis u) relative to the housing 100 to help ensure that that retaining piece 200 remains properly aligned with the housing 100.

Figure 10:
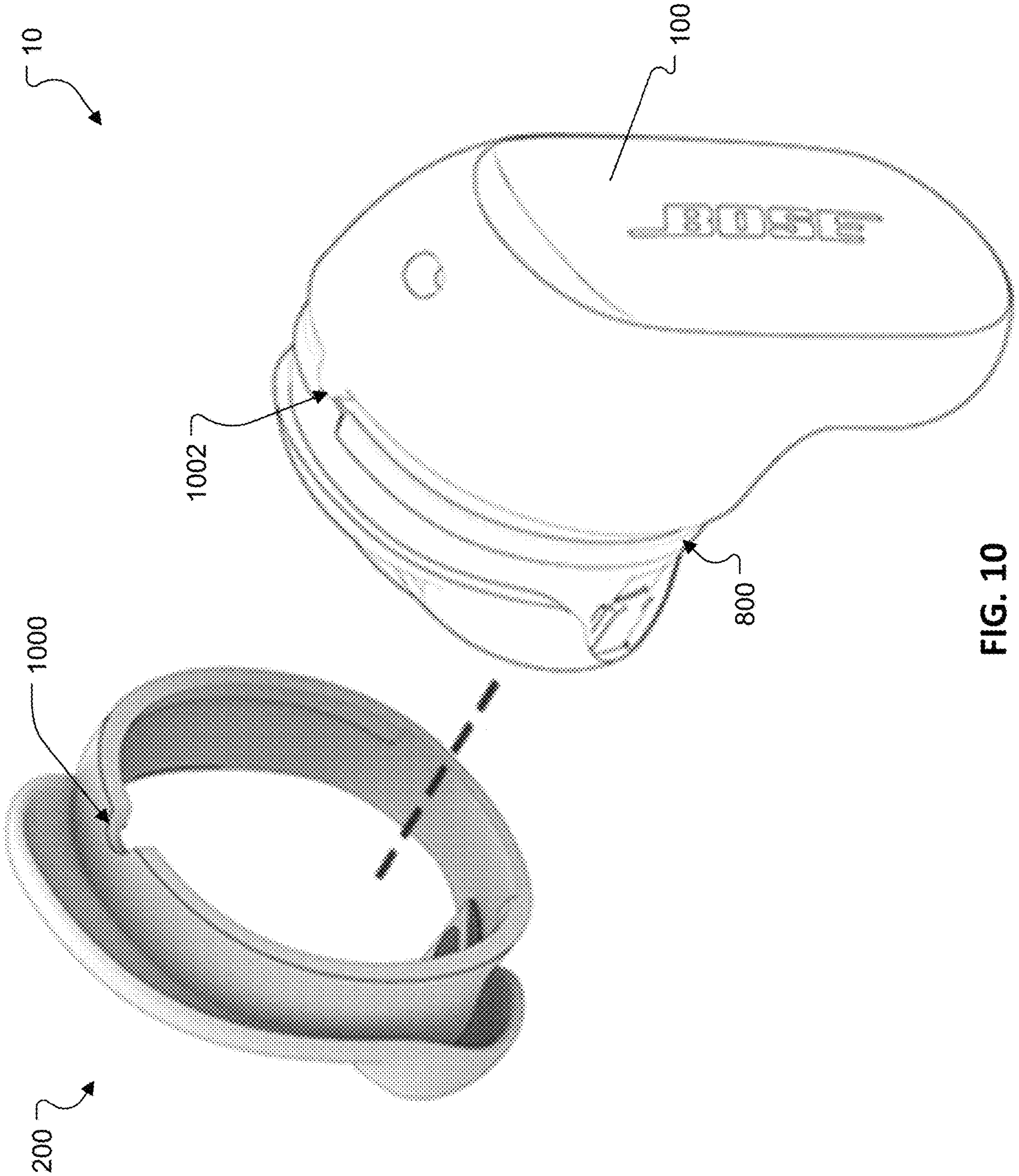
FIG. 10 is a perspective view of a fourth embodiment of the in-ear earpiece including the retaining piece, housing, nozzle and ear tip, according to aspects of the present disclosure.

FIG. 10 illustrates another implementation in which the first alignment feature (on the retaining piece 200) takes the form of an alignment notch 1000 and the second alignment feature (on the housing 100) takes the form of an alignment key 1002.

Figure 11:
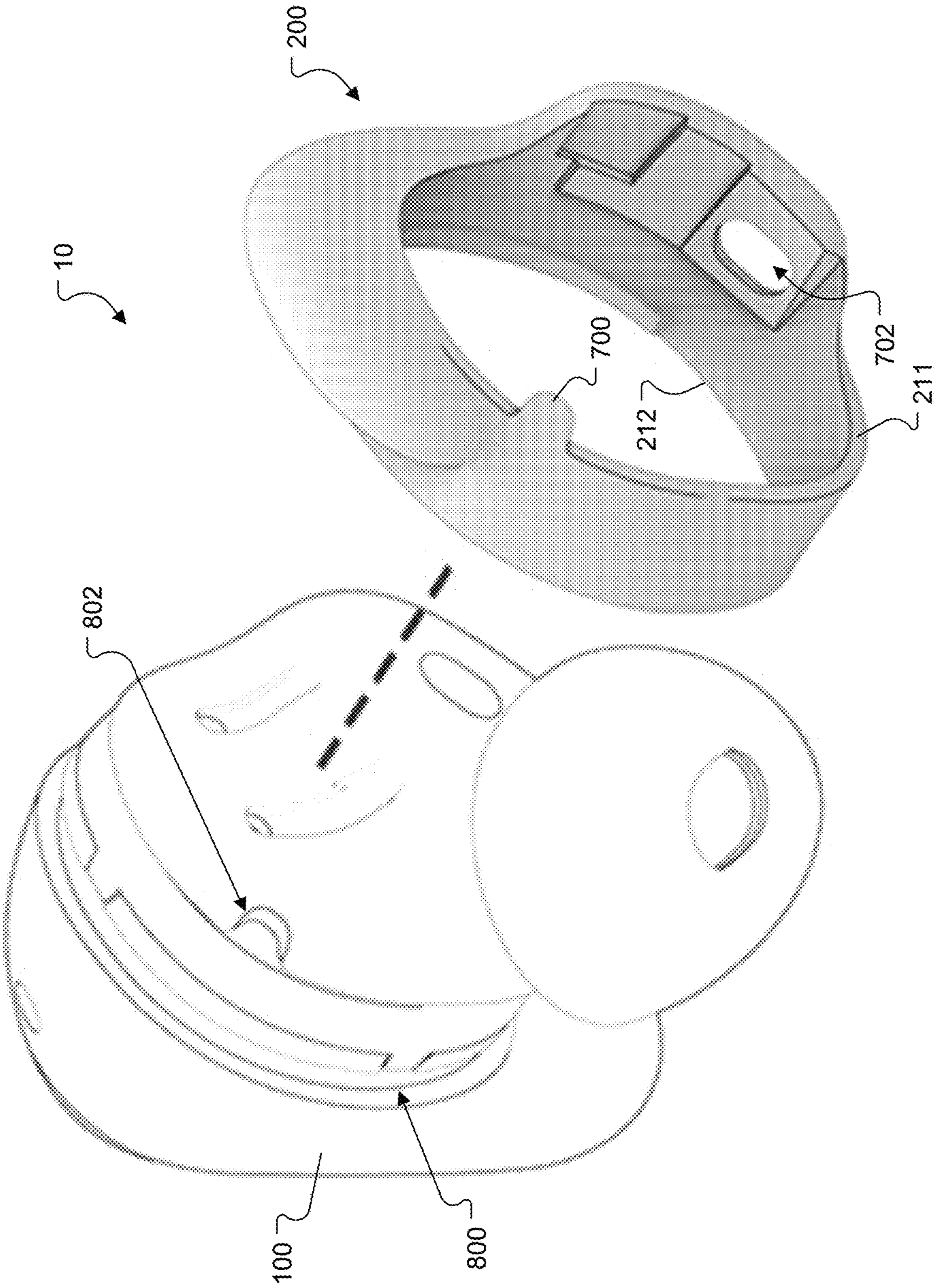
FIG. 11 is a perspective view of a fifth embodiment of the in-ear earpiece including the retaining piece, housing, nozzle and ear tip, according to aspects of the present disclosure.

FIG. 11 illustrates yet another implementation in which the alignment key 700 on the retaining piece 200 is offset (i.e., arranged at a non-zero angle in the circumferential direction) relative to the maximum radius Rmax (FIG. 3D). In addition, while FIG. 7 shows the alignment key 700 extending outwardly from the second end 212 of the retainer portion 210, the alignment key 700 may, alternatively, extend outwardly from the first end 211 of the retainer portion 210, such as shown in FIG. 11.

Figure 12:
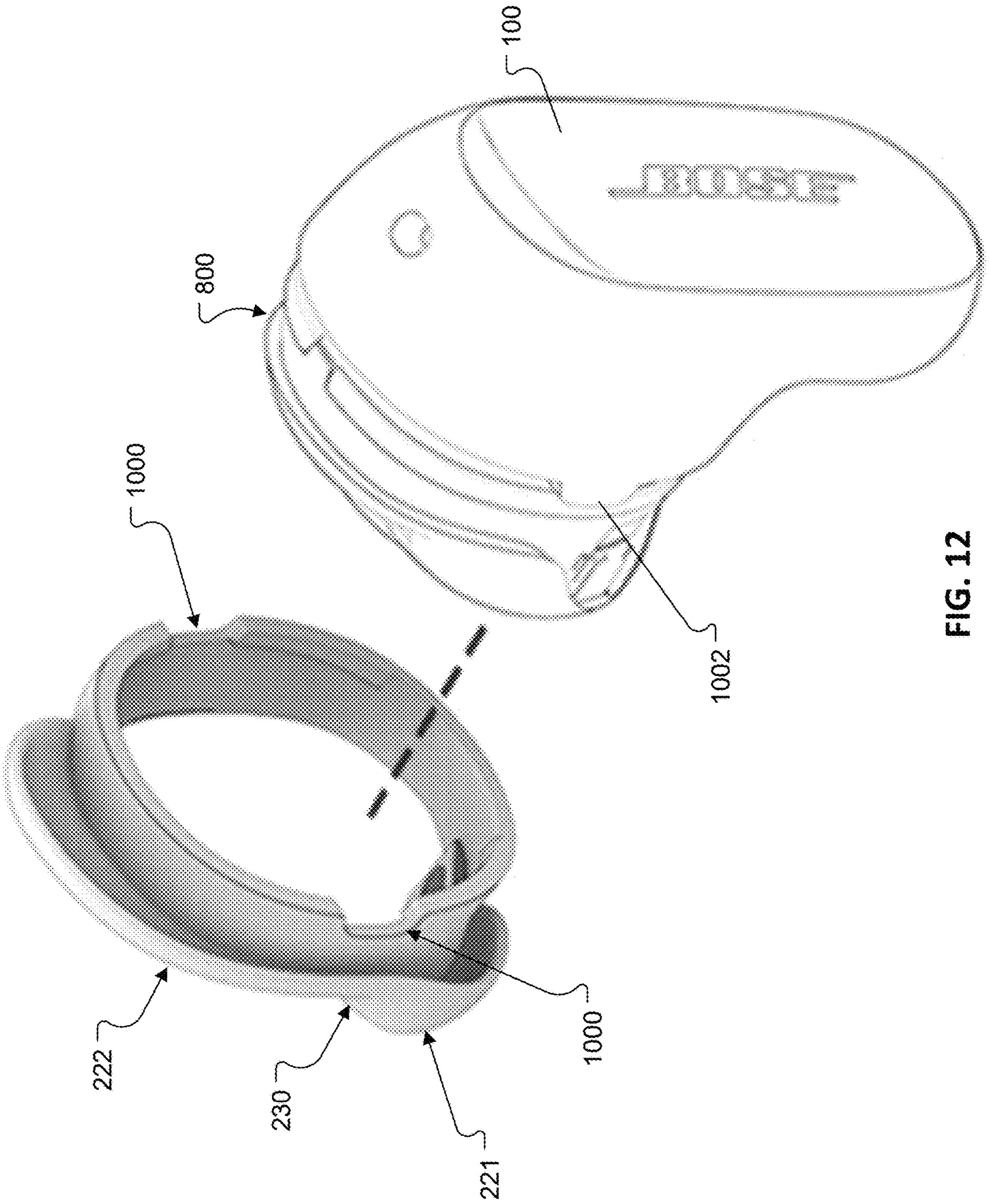
FIG. 12 is a perspective view of a sixth embodiment of the in-ear earpiece.

FIG. 12 illustrates yet another implementation in which the alignment notch 1000 on the retaining piece 200 is offset (i.e., arranged at a non-zero angle in the circumferential direction) relative to the maximum radius Rmax (FIG. 3D). As shown in FIG. 12, the alignment notch 1000 may be aligned with the transition region 230 (FIG. 3C) between the first cantilevered sub-portion 221 and the second cantilevered sub-portion 222.

In some implementations, the retaining piece 200 and the housing 100 may each include multiple alignment features. For example, the retaining piece 200 illustrated in FIG. 12 includes a pair of alignment notches 1000 which align with a corresponding pair of alignment keys 1002 (one shown) on the housing 100. Alternatively, the retaining piece 210 may include multiple alignment keys that engage with respective alignment notches on the housing 100.

Alternatively, or additionally, the retaining piece 200 may include both an alignment key and an alignment notch that engage with a mating alignment notch and a mating alignment key, respectively, on the housing 100.

FIGS. 9-12 illustrate third, fourth, fifth and sixth embodiments, respectively, of the earpiece 10. The features described above in relation to the first embodiment (FIGS. 2A to 2D) and the second embodiment (FIGS. 4A to 4C) may apply to the third, fourth, fifth and/or embodiments, and vice versa.

The earpiece 10 described herein may be applicable to a variety of devices, including audio headphones, hearing aids, hearing assistance headphones, noise-masking earbuds, ANR headphones, aviation headphones, and other devices that include an in-ear component. According to a fourth aspect of the present disclosure (not shown in the Figs.), an in-ear audio device is provided which comprises at least one earpiece 10 (having the retaining piece 200) as described above. In an example, a first earpiece 10 may be configured to engage with the user's right ear, and a second earpiece 10, which is a mirror image of the first earpiece 10, is configured to engage with a user's left ear. The in-ear audio device may be configured to connect to a wireless network (e.g., a Bluetooth or WiFi network), The in-ear audio device can be adapted to receive wirelessly personalized acoustic signals from different audio devices (e.g., a mobile phone, television, or radio). Furthermore, the in-ear audio device may be an input device and/or an output device. In some examples, the in-ear audio device may be an in-ear audio output device (e.g., functions as a speaker), or may be an in-ear audio input device (e.g., functions as a microphone), or may be a combination thereof.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. A retaining piece comprising:

a retainer portion comprising a tubular wall portion extending around a central axis, which extends through the center of the retaining piece;

a cantilevered portion; and a first alignment feature arranged along the tubular wall portion in a direction parallel to the central axis, wherein the first alignment feature comprises an alignment key that extends outwardly from the retainer portion, and wherein the cantilevered portion comprises:

a first cantilevered portion configured to at least partially contact the antitragus of a wearer's ear when the retaining piece is worn; and a second cantilevered portion configured to at least partially contact the antihelix of the wearer's ear when the retaining piece is worn.

2. The retaining piece of claim 1, wherein the first alignment feature is arranged at a position that is aligned with a location of a maximum radius of the retaining piece.

3. The retaining piece of claim 1, wherein the retainer portion comprises a first end and a second end, which is opposite the first end, wherein the first end is configured to be more medial than the second end when the retaining piece is worn by a user, and wherein the first alignment feature is disposed along the second end of the retainer portion.

4. The retaining piece of claim 3, wherein the cantilevered portion is coupled to the retainer portion between the first end and the second end.

5. The retaining piece of claim 3, wherein the cantilevered portion comprises a coupling edge and a free edge, which is opposite the coupling edge, wherein the cantilevered portion is coupled to the retainer portion at the coupling edge, and wherein the coupling edge is arranged closer to the first end than to the second end, and the free edge is arranged between coupling edge and second end.

6. The retaining piece of claim 5, wherein the cantilevered portion comprises a convexly curved section between the coupling edge and the free edge.

7. The retaining piece of claim 5, wherein the retaining piece is configured such that the coupling edge is more medial than the free edge when the retaining piece is worn by the user.

8. The retaining piece of claim 1, wherein the cantilevered portion defines a trough shape, wherein the trough shape is formed by the cantilevered portion and an outer circumferential surface of the retainer portion.

9. The retaining piece of claim 8, wherein a bottom of the trough shape is more medial than an opening of the trough shape when the retaining piece is worn by a user.

10. The retaining piece of claim 1, wherein the cantilevered portion extends over about 30% to 70% of a total circumference of the retainer portion.

11. The retaining piece of claim 1, wherein a first side of the first cantilevered portion is primarily on a first plane and a first side of the second cantilevered portion is primarily on a second plane different than the first plane, wherein the first plane and the second plane are perpendicular to the central axis.

12. An earpiece comprising:

the retaining piece of claim 1, and a housing configured to be coupled to the retaining piece, wherein the housing includes a second alignment feature that is configured to align with the first alignment feature on the retaining piece the ensure a specific orientation of the cantilevered portion of the retaining piece with respect to the housing.

13. The earpiece of claim 12, wherein the second alignment feature comprises an alignment notch that is configured to receive the alignment key.

14. The earpiece of claim 12, wherein the housing further comprises a groove configured to receive the tubular wall portion.

15. The earpiece of claim 14, wherein the groove extends about an outer circumference of the housing.

* * * * *